United States Patent
Do et al.

(10) Patent No.: US 12,218,121 B2
(45) Date of Patent: Feb. 4, 2025

(54) SEMICONDUCTOR DEVICES HAVING IMPROVED LAYOUT DESIGNS, AND METHODS OF DESIGNING AND FABRICATING THE SAME

(71) Applicant: Samsung Electronics Co., Ltd., Suwon-si (KR)

(72) Inventors: Jung Ho Do, Hwaseong-si (KR); Sanghoon Baek, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 741 days.

(21) Appl. No.: 17/373,510

(22) Filed: Jul. 12, 2021

(65) Prior Publication Data

US 2022/0189944 A1    Jun. 16, 2022

(30) Foreign Application Priority Data

Dec. 15, 2020   (KR) .................. 10-2020-0174964

(51) Int. Cl.
| | | |
|---|---|---|
| *G06F 30/392* | (2020.01) | |
| *G06F 30/394* | (2020.01) | |
| *H01L 23/528* | (2006.01) | |
| *H01L 27/02* | (2006.01) | |
| *H01L 27/092* | (2006.01) | |

(52) U.S. Cl.
CPC ........ *H01L 27/0207* (2013.01); *G06F 30/392* (2020.01); *G06F 30/394* (2020.01); *H01L 23/5286* (2013.01); *H01L 27/0924* (2013.01)

(58) Field of Classification Search
USPC .................................. 716/110, 118, 119, 126
See application file for complete search history.

(56) References Cited

U.S. PATENT DOCUMENTS

| | | | |
|---|---|---|---|
| 7,475,375 B2 | 1/2009 | Nakanishi | |
| 7,698,675 B2 | 4/2010 | Kitano | |
| 9,831,271 B2 | 11/2017 | Tamaru | |
| 10,236,302 B2 | 3/2019 | Correale et al. | |
| 10,366,196 B2 | 7/2019 | Correale et al. | |
| 2021/0104611 A1* | 4/2021 | Yu ........................ | H01L 29/401 |

(Continued)

FOREIGN PATENT DOCUMENTS

| | | |
|---|---|---|
| CN | 111466020 A | 7/2020 |
| JP | 2019145823 A | 8/2019 |

(Continued)

*Primary Examiner* — Brian Ngo
(74) *Attorney, Agent, or Firm* — Myers Bigel, P.A.

(57) ABSTRACT

A semiconductor device includes a first logic gate defined within a first unit cell footprint on a semiconductor substrate. The first logic gate includes a first field effect transistor including a first gate electrode and a first source/drain region, and a second field effect transistor including a second gate electrode and a second source/drain region. A first wiring pattern is provided, which extends in a first direction across a portion of the first unit cell footprint. The first wiring pattern is electrically connected to at least one of the first gate electrode and the second source/drain region, and has: (i) a first terminal end within a perimeter of the first unit cell footprint, and (ii) a second terminal end, which extends outside the perimeter of the first unit cell footprint but is not electrically connected to any current carrying region of any semiconductor device that is located outside the perimeter of the first unit cell footprint.

20 Claims, 33 Drawing Sheets

(56) References Cited

U.S. PATENT DOCUMENTS

2021/0305232 A1\* 9/2021 You ................... H01L 29/42392
2022/0069078 A1\* 3/2022 Yu ....................... H01L 29/0673

FOREIGN PATENT DOCUMENTS

| KR | 20200094143 A | 8/2020 |
| WO | 2019116883 A1 | 6/2019 |
| WO | 2019132944 A1 | 7/2019 |

\* cited by examiner

SEMICONDUCTOR DEVICES HAVING IMPROVED LAYOUT DESIGNS, AND METHODS OF DESIGNING AND FABRICATING THE SAME

REFERENCE TO PRIORITY APPLICATION

This application claims priority under 35 U.S.C. § 119 to Korean Patent Application No. 10-2020-0174964, filed Dec. 15, 2020, the disclosure of which is hereby incorporated herein by reference.

BACKGROUND

1. Technical Field

The present inventive concept relates to semiconductor devices, layout design methods for the semiconductor devices, and methods for fabricating the semiconductor devices with improved highly integrated layout.

2. Description of the Related Art

Semiconductor devices are often spotlighted as an important factor in the electronic industry due to characteristics such as miniaturization, multi-functionality and/or low fabricating cost. Semiconductor devices can be generally classified into semiconductor storage devices that store logical data, semiconductor logical devices that perform arithmetic processing of logical data, hybrid semiconductor devices that include storage elements and logical elements, and the like.

As the electronic industry develops to a higher degree, the demand for improved characteristics of semiconductor devices increases accordingly. For example, there are increasing demands for higher reliability, higher speed, and/or multi-functionality of the semiconductor devices. In order to satisfy such commercial demands, the structures inside the semiconductor device are becoming more complicated and more highly integrated.

SUMMARY

Aspects of the present inventive concepts include a semiconductor device capable of securing efficient PnR (Placement and Routing) resources.

Additional aspects of the present inventive concept also provide a layout design method for a semiconductor device capable of securing efficient PnR resources.

Further aspects of the present inventive concept provide a method for fabricating a semiconductor device capable of securing efficient PnR resources.

According to some aspects of the present inventive concept, there is provided a semiconductor device including a first cell region, which includes an active pattern extending in a first direction, inside the first cell region, and a gate electrode extending in a second direction intersecting the first direction, inside the first cell region. A source/drain contact is also provided, which is connected to a source/drain region of the active pattern, on one side of the gate electrode. A first wiring pattern is provided, which extends in the first direction and is electrically connected to one of the gate electrode and the source/drain contact. Advantageously, to meet minimum design/layout rules associated with the PnR resources, a part of the first wiring pattern protrudes from a boundary of the first cell region. Moreover, a length of the first wiring pattern extending in the first direction is two gate pitches or less.

According to some additional aspects of the present inventive concept, there is provided a semiconductor device having a first cell region and a second cell region therein, which extend immediately adjacent to each other and are arranged along a first direction. The semiconductor device includes a substrate, and a first cell separation pattern thereon, which extends in a second direction intersecting the first direction and separates the first cell region and the second cell region. An active pattern is provided in the substrate, and extends in the first direction. A first gate electrode is also provided on the substrate. The first gate electrode extends in the second direction and is spaced apart from the first cell separation pattern by one gate pitch in the first cell region. A first source/drain contact is provided, which is connected to a source/drain region of the active pattern of the first cell region (on one side of the first gate electrode). And, a first wiring pattern is provided, which extends in the first direction over the first cell region and the second cell region, and is connected to one of the first gate electrode and the first source/drain contact. Advantageously, a length of the first wiring pattern extending in the first direction is two gate pitches or less.

According to further aspects of the present inventive concept, there is provided a layout design method for a semiconductor device. This layout design method includes providing a first cell region, and providing a second cell region arranged adjacent to the first cell region along a first direction. The first cell region includes: a gate electrode extending in a second direction intersecting the first direction, a source/drain contact connected to a source/drain region of the first cell region (on one side of the gate electrode), and a first wiring pattern. The first wiring pattern extends in the first direction over the first cell region and the second cell region, and is connected to one of the gate electrode and the source/drain contact.

A semiconductor device according to further aspects of an inventive concept include a first logic gate defined within a first unit cell footprint on a semiconductor substrate. The first logic gate includes a first field effect transistor containing a first gate electrode and a first source/drain region. A second field effect transistor is provided, which includes a second gate electrode and a second source/drain region. A first wiring pattern is provided, which extends in a first direction across a portion of the first unit cell footprint. The first wiring pattern is electrically connected to at least one of the first gate electrode and the second source/drain region, and has: (i) a first terminal end within a perimeter of the first unit cell footprint, and (ii) a second terminal end, which extends outside the perimeter of the first unit cell footprint but is not electrically connected to any current carrying region of any semiconductor device that is located outside the perimeter of the first unit cell footprint. In some of these aspects, a length of the first wiring pattern is equivalent to a minimum allowable length thereof, as defined by a corresponding layout design rule associated with the first logic device (and verified by a design rule checking (DRC) algorithm associated with a corresponding method of fabrication). For example, the length of the first wiring pattern may be in a range from about 0.5 times GP to about 1.5 times GP, where GP is a gate-to-gate pitch within the first unit cell. The first logic gate may be selected from a group consisting of NAND, AND, NOR and XOR logic gates, for example.

According to still further aspects, no portion of the first wiring pattern that is located outside the perimeter of the first unit cell footprint is electrically connected to any current carrying region of any semiconductor device that is not within the first logic device. Instead, all portions of the first wiring pattern that are outside the perimeter of the first unit cell footprint are provided to meet the minimum design rule requirement(s) associated with the first wiring pattern (e.g., minimum length for corresponding fabrication process), yet provide minimum parasitic capacitive loading to the first wiring pattern. Thus, if a second logic gate is defined within a second unit cell footprint on the semiconductor substrate, which extends immediately adjacent the first unit cell footprint, the second terminal end of first wiring pattern may extend within a perimeter of the second unit cell footprint but not be connected to any current carrying terminals associated with the second logic gate.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Although terms such as first and second are used herein to describe various elements or components, it goes without saying that these elements or components are not limited to such terms. These terms are used to merely distinguish a single element or component from other elements or components. Therefore, it goes without saying that the first element or component described below may be a second element or component within the technical idea of the present inventive concept.

Figure 1:
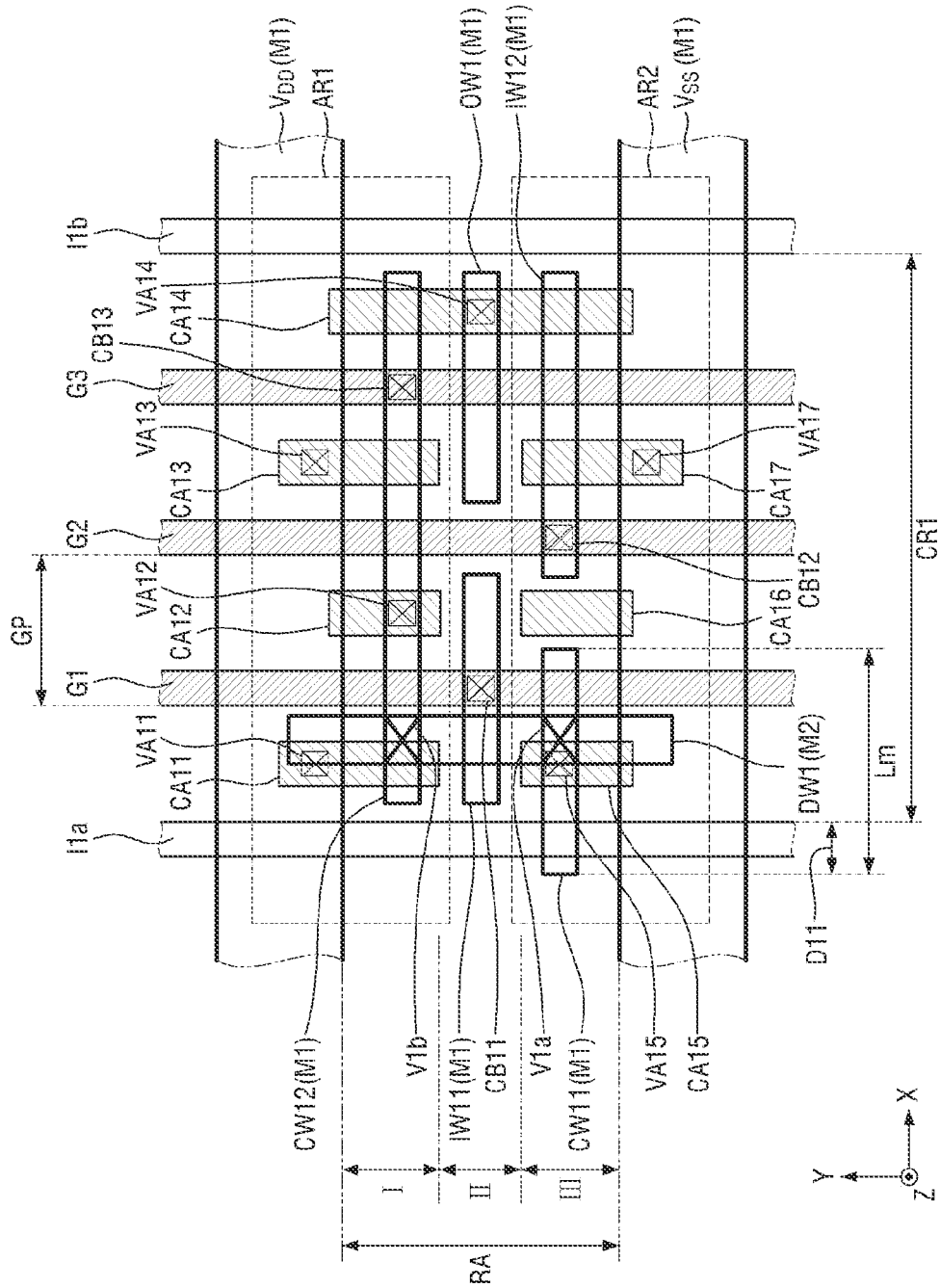
FIG. 1 is a layout diagram for explaining the semiconductor device according to some embodiments.

Hereinafter, a semiconductor device according to some embodiments will be described referring to FIGS. 1 to 23. FIG. 1 is a layout diagram for explaining the semiconductor device according to some embodiments. Referring to FIG. 1, the semiconductor device according to some embodiments includes a first cell region CR1.

A standard cell provided by a cell library may be provided inside the first cell region CR1. In FIG. 1, the standard cell provided in the first cell region CR1 is a 2-input AND (AND2) cell, which may be configured from six (6) transistors (3 NMOS, 3 PMOS). However, this is only an example, and it goes without saying that the standard cell provided in the first cell region CR1 may be diverse, for example, a NAND cell, a NOR cell, and an XOR cells.

In some embodiments, the first cell region CR1 may be defined by a first cell separation pattern I1$a$ and a second cell separation pattern I1$b$ spaced apart along a first direction X. For example, the first cell separation pattern I1$a$ and the second cell separation pattern I1$b$ may extend side by side (and lengthwise) in a second direction Y which intersects the first direction X. The first cell region CR1 may be defined between the first cell separation pattern I1$a$ and the second cell separation pattern I1$b$.

The semiconductor device according to some embodiments provided in the first cell region CR1 may include a first active region AR1, a second active region AR2, first to third gate electrodes G1 to G3, a plurality of source/drain contacts CA11 to CA17, a plurality of first contact vias VA11 to VA17, a plurality of gate contacts CB11 to CB13, a first power supply wiring $V_{DD}$, a second power supply wiring $V_{SS}$, a plurality of first routing wirings IW11, IW12, CW11, CW12, and OW1, and a second routing wiring DW1.

The first active region AR1 and the second active region AR2 may be spaced apart from each other and extend side by side. For example, the first active region AR1 and the second active region AR2 may each extend lengthwise in the first direction X. The second active region AR2 may be spaced apart from the first active region AR1 in the second direction Y.

In some embodiments, semiconductor elements of different conductivity types (e.g., transistors) may be formed on the first active region AR1 and the second active region AR2. Hereinafter, it will be described that the first active region AR1 is a PFET region and the second active region AR2 is an NFET region. However, this is only an example, and it goes without saying that the first active region AR1 may be the NFET region and the second active region AR2 may be the PFET region.

The first to third gate electrodes G1 to G3 may be interposed between the first cell separation pattern I1$a$ and the second cell separation pattern I1$b$. The first to third gate electrodes G1 to G3 may each intersect (i.e., extend over) the first active region AR1 and the second active region AR2. For example, the first to third gate electrodes G1 to G3 may be spaced apart from each other in the first direction X and extend lengthwise in the second direction Y, as shown.

The first to third gate electrodes G1 to G3 may be adjacent to each other and arranged sequentially along the first direction X. That is, no other gate electrode or other cell separation pattern may be placed between the first to third gate electrodes G1 to G3. As used herein, adjacent gate electrodes may be referred to as being spaced apart from each other by one gate pitch GP. As an example, as shown, the single gate pitch GP may be defined as a spaced distance between one side of the first gate electrode G1 and one side of the second gate electrode G2, or possibly as a center-to-center "integrate" spacing for side-by-side gate electrodes having the same width. The one gate pitch GP may be, but is not limited to, for example, 30 nm to 60 nm. As an example, the one gate pitch GP may be 50 nm to 60 nm. As another example, the one gate pitch GP may be 40 nm to 50 nm. As another example, the one gate pitch GP may be 30 nm to 40 nm.

In some embodiments, each of the first cell separation pattern I1a and the second cell separation pattern I1b may be spaced apart from adjacent gate electrodes by one gate pitch GP. As an example, the first gate electrode G1 and the first cell separation pattern I1a may be spaced apart from each other by the one gate pitch GP, and the third gate electrode G3 and the second cell separation patterns I1b may be spaced apart from each other by one gate pitch GP.

A plurality of source/drain contacts CA11 to CA17 may be placed on both sides of the first to third gate electrodes G1 to G3. The plurality of source/drain contacts CA11 to CA17 may be connected to source/drain regions of the first active region AR1 or the second active region AR2. For example, a first source/drain contact CA11 may be formed on the first active region AR1 between the first gate electrode G1 and the first cell separation pattern I1a. A second source/drain contact CA12 may be formed on the first active region AR1 between the first gate electrode G1 and the second gate electrode G2. A third source/drain contact CA13 may be formed on the first active region AR1 between the second gate electrode G2 and the third gate electrode G3. A fourth source/drain contact CA14 may be formed on the first active region AR1 and the second active region AR2 between the third gate electrode G3 and the second cell separation pattern I1b. A fifth source/drain contact CA15 may be formed on the second active region AR2 between the first gate electrode G1 and the first cell separation pattern I1a. A sixth source/drain contact CA16 may be formed on the second active region AR2 between the first gate electrode G1 and the second gate electrode G2. A seventh source/drain contact CA17 may be formed on the second active region AR2 between the second gate electrode G2 and the third gate electrode G3.

The plurality of first contact vias VA11 to VA17 may be placed to overlap corresponding ones of the plurality of source/drain contacts CA11 to CA17. Here, the term "overlap" means an overlap in a third direction Z that intersects the first direction X and the second direction Y. The first contact vias VA11 to VA17 may be connected to the source/drain contacts CA11 to CA17, respectively.

The plurality of gate contacts CB11 to CB13 may be placed to overlap the first gate electrode G1, the second gate electrode G2, and the third gate electrode G3, respectively. Here, the term "overlap" means an overlap in the third direction Z. As shown, the first gate contact CB11 may be connected to the first gate electrode G1, the second gate contact CB12 may be connected to the second gate electrode G2, and the third gate contact CB13 may be connected to the third gate electrode G3.

The first power supply wiring $V_{DD}$ and the second power supply wiring $V_{SS}$ may be spaced apart from each other in the second direction Y. For example, the first power supply wiring $V_{DD}$ and the second power supply wiring $V_{SS}$ may each extend lengthwise in the first direction X, and second power supply wiring $V_{SS}$ may be spaced apart from the first power supply wiring $V_{DD}$ in the second direction Y.

The first power supply wiring $V_{DD}$ and the second power supply wiring $V_{SS}$ may provide a power supply voltage to the first cell region CR1. In some embodiments, a drain voltage may be applied to the first power supply wiring $V_{DD}$, and a source voltage may be applied to the second power supply wiring $V_{SS}$. For example, a positive (+) voltage may be applied to the first power supply wiring $V_{DD}$, and a ground GND voltage or a negative (−) voltage may be applied to the second power supply wiring $V_{SS}$, but the embodiment is not limited thereto.

The first power supply wiring $V_{DD}$ and the second power supply wiring $V_{SS}$ may be formed in a BEOL (back end-of-line) process step. In some embodiments, the first power supply wiring $V_{DD}$ and the second power supply wiring $V_{SS}$ may be formed at the same routing level as first routing wirings IW11, IW12, CW11, CW12, and OW1 to be explained below. For example, the first power supply wiring $V_{DD}$ and the second power supply wiring $V_{SS}$ may be placed at the first routing level M1, as explained more fully hereinbelow.

The first power supply wiring $V_{DD}$ may be connected to some of the source/drain contacts CA11 to CA17. For example, the first power supply wiring $V_{DD}$ may be connected to the first via pattern VA11 and the third via pattern VA13. Accordingly, the first source/drain contact CA11 and the third source/drain contact CA13 may be connected to the first power supply wiring $V_{DD}$. In contrast, the second power supply wiring $V_{SS}$ may be connected to some other parts of the source/drain contacts CA11 to CA17. For example, the second power supply wiring $V_{SS}$ may be connected to the seventh via pattern VA17. Accordingly, the seventh source/drain contact CA17 may be connected to the second power wiring $V_{SS}$.

Each of the plurality of first routing wirings IW11, IW12, CW11, CW12, and OW1 may extend in the first direction X. The first routing wirings IW11, IW12, CW11, CW12, and OW1 may be formed at the BEOL process step. The first routing wirings IW11, IW12, CW11, CW12, and OW1 may be formed at the same routing level as each other. For example, the first routing wirings IW11, IW12, CW11, CW12, and OW1 may be placed at the first routing level M1. In some embodiments, the first routing level M1 may be a routing level placed at the lowermost part among the wirings formed at the BEOL process step.

In some embodiments, the first routing wirings IW11, IW12, CW11, CW12, and OW1 may be interposed between the first power supply wiring $V_{DD}$ and the second power supply wiring $V_{SS}$. For example, a routing region RA may be defined between the first power supply wiring $V_{DD}$ and the second power supply wiring $V_{SS}$. The routing region RA may include first to third routing tracks I to III arranged sequentially along the second direction Y, as an example. Each of the first routing wirings IW11, IW12, CW11, CW12, and OW1 may be placed in one of the first to third routing tracks I to III. In some embodiments, the routing region RA may include three or less routing tracks.

The first routing wirings IW11, IW12, CW11, CW12, and OW1 may be connected to some of the source/drain contacts CA11 to CA17 or some of the gate contacts CB11 to CB13. As an example, the first routing wirings IW11, IW12, CW11, CW12, and OW1 may include first to fifth wiring patterns IW11, IW12, CW11, CW12, and OW1.

The first wiring pattern IW11 is placed in the second routing track II, and may be connected to the first gate contact CB11. As a result, the first gate electrode G1 may be connected to the first wiring pattern IW11. The first wiring pattern IW11 may function as a first input wiring that provides a first input signal to the first cell region CR1. In contrast, the second wiring pattern IW12 is placed inside the third routing track III, and may be connected to the second gate contact CB12. As a result, the second gate electrode G2 may be connected to the second wiring pattern IW12. The second wiring pattern IW12 may function as a second input wiring that provides a second input signal to the first cell region CR1. Next, the third wiring pattern CW11 is placed inside the third routing track III, and may be connected to a fifth via pattern VA15. As a result, the fifth source/drain contact CA15 may be connected to the third wiring pattern CW11. The third wiring pattern CW11 may function as a connection wiring that connects signals in the first cell region CR1.

A fourth wiring pattern CW12 is placed in the first routing track I, and may be connected to the second via pattern VA12 and the third gate contact CB13. As a result, the second source/drain contact CA12 and the third gate electrode G3 may be connected to the fourth wiring pattern CW12. The fourth wiring pattern CW12 may function as a connection wiring that connects signals in the first cell region CR1. A fifth wiring pattern OW1 is placed in the second routing track II, and may be connected to the fourth via pattern VA14. As a result, the fourth source/drain contact CA14 may be connected to the fifth wiring pattern OW1. The fifth wiring pattern OW1 may function as a first output wiring that provides the first output signal from the first cell region CR1.

In some embodiments, the first routing wirings IW11, IW12, CW11, CW12, and OW1 placed inside the same routing track may be spaced apart from each other by a predetermined distance. This may be due to a width of a mask pattern that separates the first routing wirings IW11, IW12, CW11, CW12, and OW1. For example, a spaced distance between the first wiring pattern IW11 and the fifth wiring pattern OW1 in the second routing track II may be the same as a spaced distance between the third wiring pattern CW11 and the second wiring pattern IW12 in the third routing track III. As used herein, the meaning of the term "same" includes not only exactly the same thing, but also minute differences that may occur due to process margins and the like.

The predetermined distance at which the first routing wirings IW11, IW12, CW11, CW12, and OW1 placed inside the same routing track are spaced apart may be, but is not limited to, for example, 10 nm to 40 nm. As an example, the spaced distance between the first wiring pattern IW11 and the fifth wiring pattern OW1, and the spaced distance between the third wiring pattern CW11 and the second wiring pattern IW12 may each be 25 nm to 35 nm.

The second routing wiring DW1 (M2) may extend in the second direction Y. The second routing wiring DW1 may be formed at the BEOL process step. The second routing wiring DW1 may be formed at a level (e.g., M2) that is higher than the first routing wirings IW11, IW12, CW11, CW12, and OW1 formed at a lower level. For example, the second routing wiring DW1 may be placed at a second routing level M2 that is higher than the first routing level M1.

The second routing wiring DW1 may be connected to some of the first routing wirings IW11, IW12, CW11, CW12, and OW1. As an example, the second routing wiring DW1 extends in the second direction Y, and may connect the first wiring pattern IW11 and the fourth wiring pattern CW12. As an example, a first routing via V1a that connects the first wiring pattern IW11 and the second routing wiring DW1 may be formed, and a second routing via V1b, which electrically connects the fourth routing pattern CW12 and the second routing wiring DW1, may be formed. Therefore, the first wiring pattern IW11 may be electrically connected to the fourth wiring pattern CW12. Thus, the "upper level" second routing wiring DW1 may function as a connection wiring that connects signals in the first cell region CR1. And, as illustrated, a 2-input AND (AND2) cell (3 NMOS, 3 PMOS) may be provided in the first cell region CR1 through the first routing wirings IW11, IW12, CW11, CW12, and OW1 and the second routing wiring DW1, as described herein.

In some embodiments, at least some of the first routing wirings IW11, IW12, CW11, CW12, and OW1 may protrude from the boundary of the first cell region CR1. For example, FIG. 1 schematically shows that the third wiring pattern CW11, at M1 (first direction X), protrudes from the boundary of the first cell region CR1. Specifically, the third wiring pattern CW11 extends in the first direction X, and may protrude from the boundary of the first cell region CR1 extending in the second direction Y. In some embodiments, a part of the third wiring pattern CW11 may overlap the first cell separation pattern I1a.

In some embodiments, the third wiring pattern CW11 protruding from the boundary of the first cell region CR1 may be close to a minimum wiring length according to defined design "ground" rules (e.g., as specified by a design rule checking (DRC) tool algorithm). Here, the minimum wiring length means a minimum length at which the routing wirings (for example, the first routing wirings IW11, IW12, CW11, CW12, and OW1) placed at the first routing level M1 may extend in the first direction X according to the defined design rules. As an example, a length Lm of the third wiring pattern CW11 extending in the first direction X may be 2 gate pitches GP or less. Alternatively, as an example, the length Lm of the third wiring pattern CW11 extending in the first direction X may be 1.5 gate pitches GP or less. As a further example, the length Lm of the third wiring pattern CW11 extending in the first direction X may be 0.5 gate pitch GP or more and 1.5 gate pitches GP or less (i.e., 0.5 GP≤Lm≤1.5 GP).

A length D11 of the third wiring pattern CW11 protruding from the boundary of the first cell region CR1 may vary, depending on the placement of the third wiring pattern CW11. As an example, the length D11 of the third wiring pattern CW11 protruding from the boundary of the first cell region CR1 may be 0.5 gate pitch GP or less. Alternatively, as an example, the length D11 of the third wiring pattern CW11 protruding from the boundary of the first cell region CR1 may be one gate pitch GP or less or 1.5 gate pitches GP or less.

As semiconductor devices become more highly integrated, securement of PnR (Placement and Routing) resources of the semiconductor devices becomes an increasingly important issue. For example, while the number of routing tracks placed in the cell region may gradually decrease, the routing wirings still need to satisfy the minimum wiring length according to the defined design rules. Thus, securing efficient PnR resources may be increasingly required.

The semiconductor device according to some embodiments may efficiently secure the PnR resources even in small areas, using the first routing wirings IW11, IW12, CW11, CW12, and OW1 that at least partially protrude from the first cell region CR1 in order to meet corresponding minimum length design rules associated with the routing wirings. For example, as described above, the third wiring pattern CW11 is placed to protrude from the boundary of the first cell region CR1, and therefore, may provide the PnR resources for other routing wirings (e.g., IW11, IW12, CW12, OW1, and DW1). If the third wiring pattern CW11 is designed by only being placed inside the boundary of the first cell region CR1, the third wiring pattern CW11 may violate the minimum wiring length according to the defined design rules, and therefore may require a larger area of the first cell region CR1, or make it difficult to place other routing wirings (e.g., IW11, IW12, CW12, OW1, and DW1). Therefore, it is possible to provide a semiconductor device capable of securing efficient PnR (Placement and Routing) resources by having at least one "internal" cell wiring protrude outside the first cell region CR1 in order to meet the minimum length design rule requirement.

Figure 2:
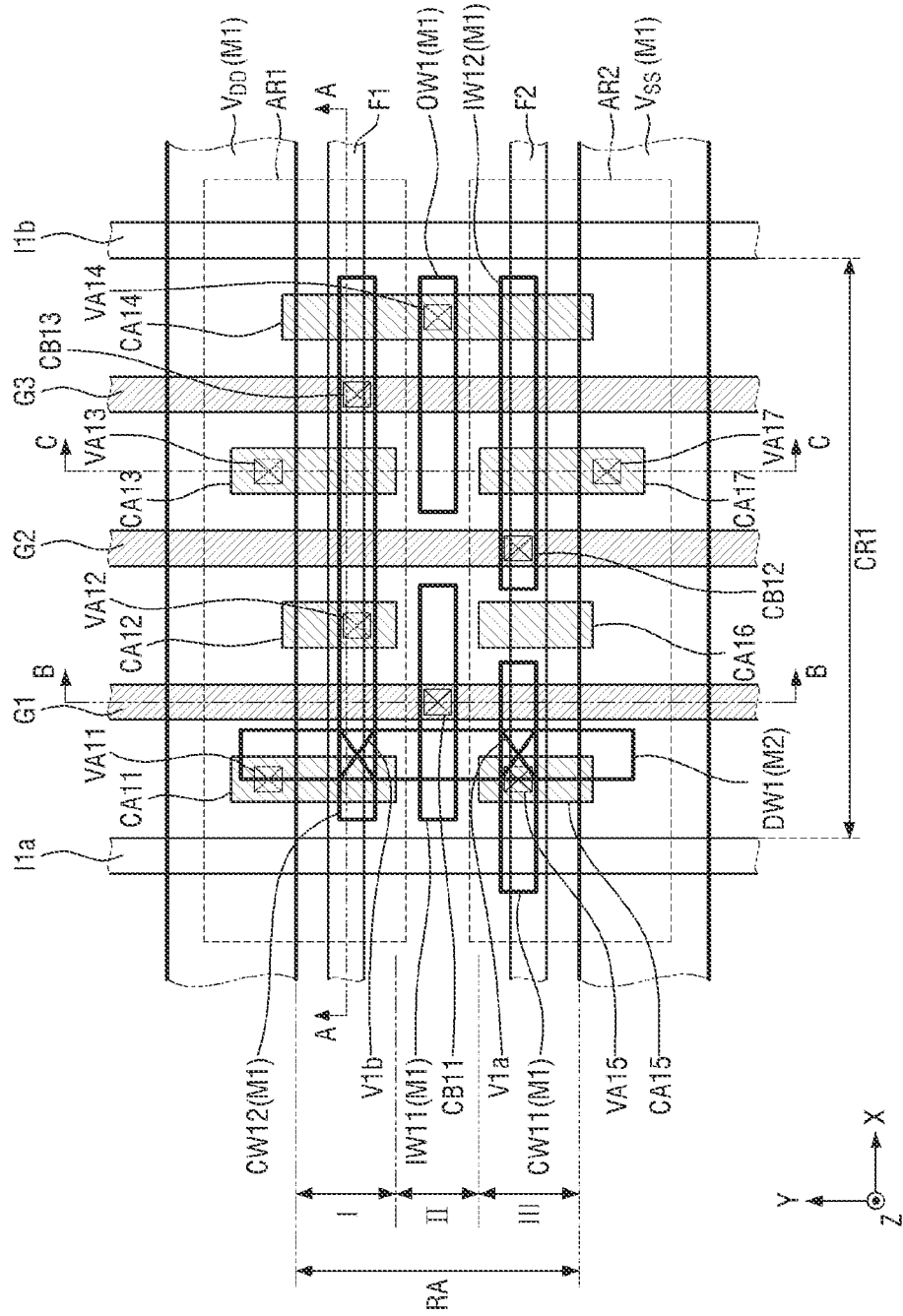
FIG. 2 is a plan view for explaining a semiconductor device according to some embodiments.
Figure 3:
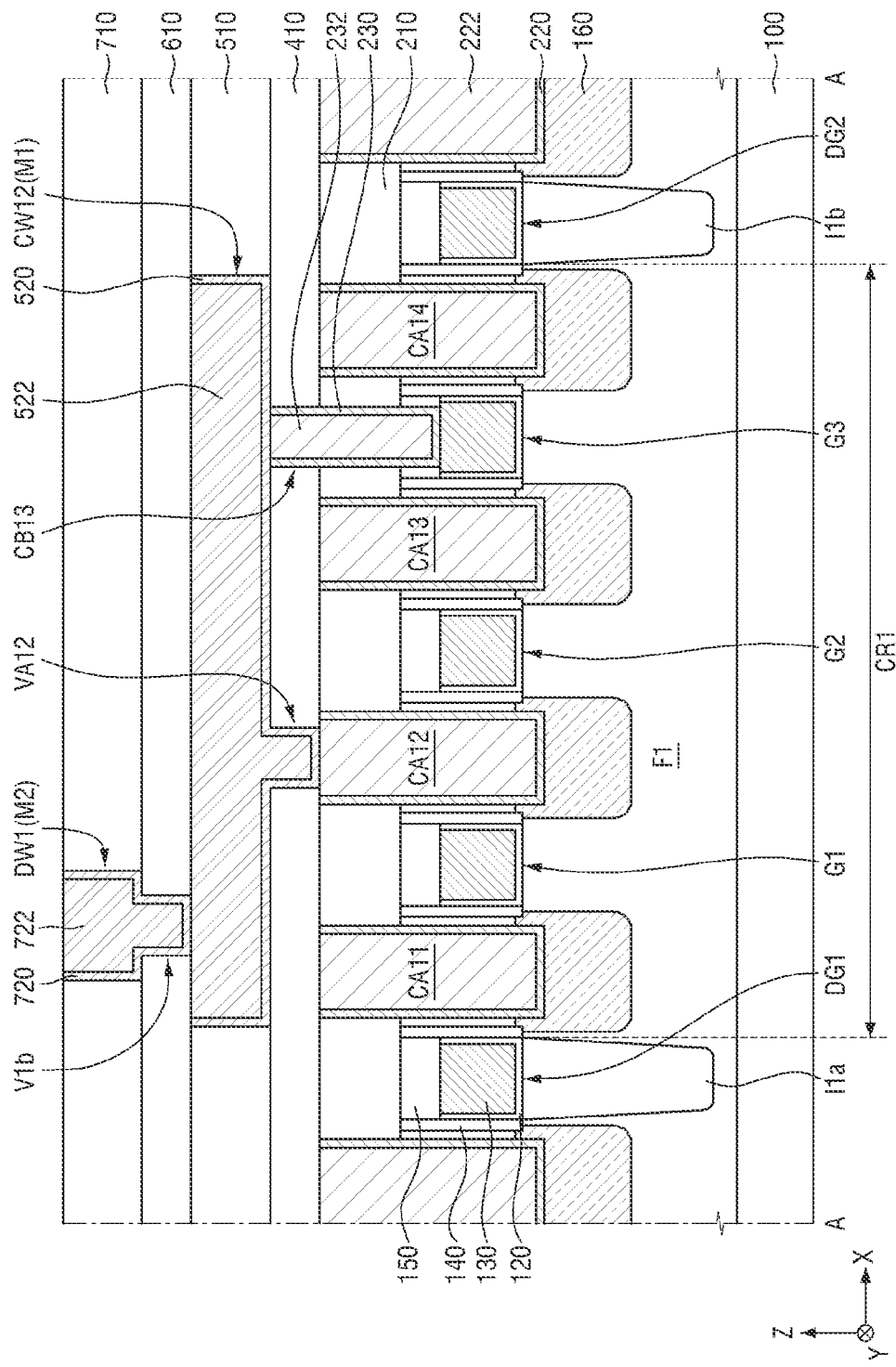
FIG. 3 is a cross-sectional view taken along line A-A of FIG. 2.
Figure 4:
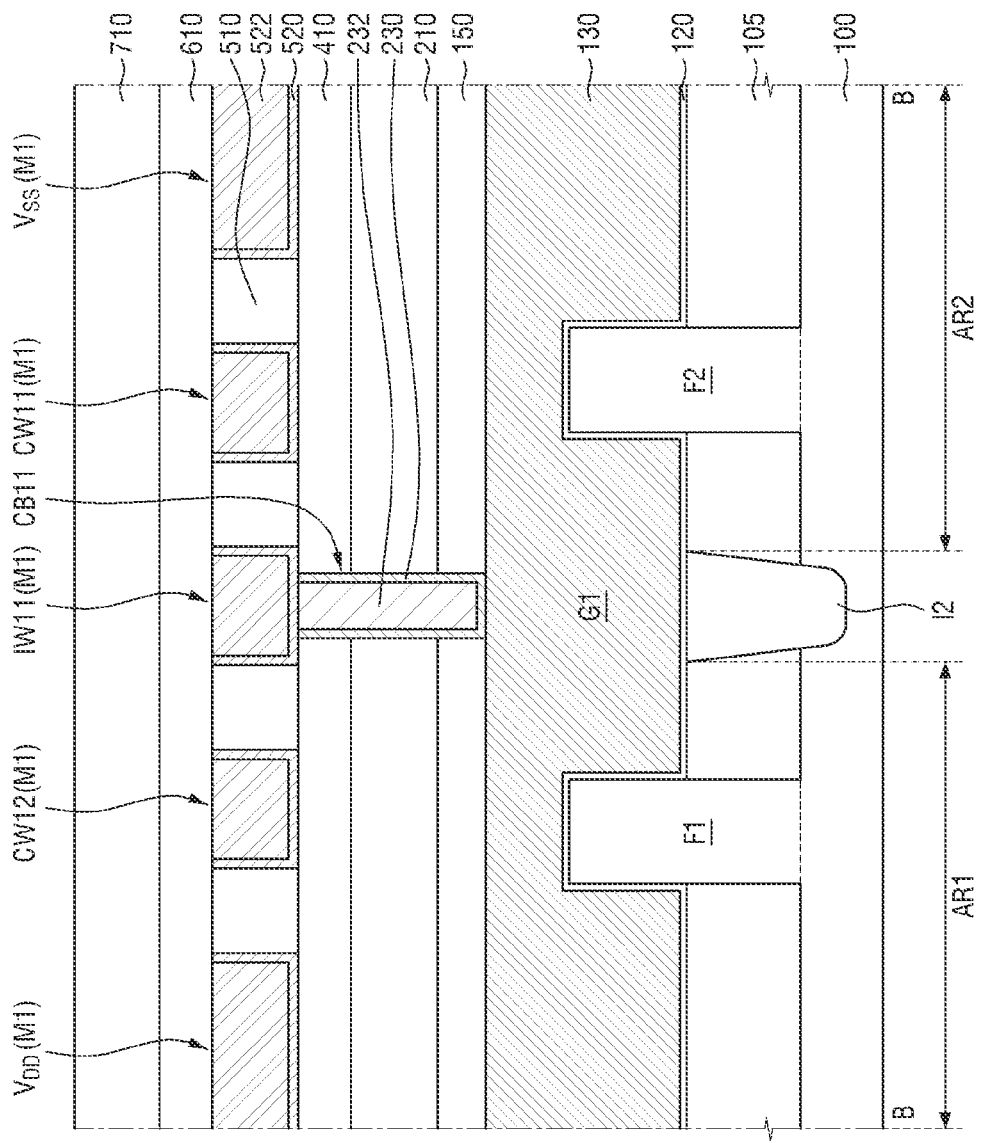
FIG. 4 is a cross-sectional view taken along line B-B of FIG. 2.
Figure 5:
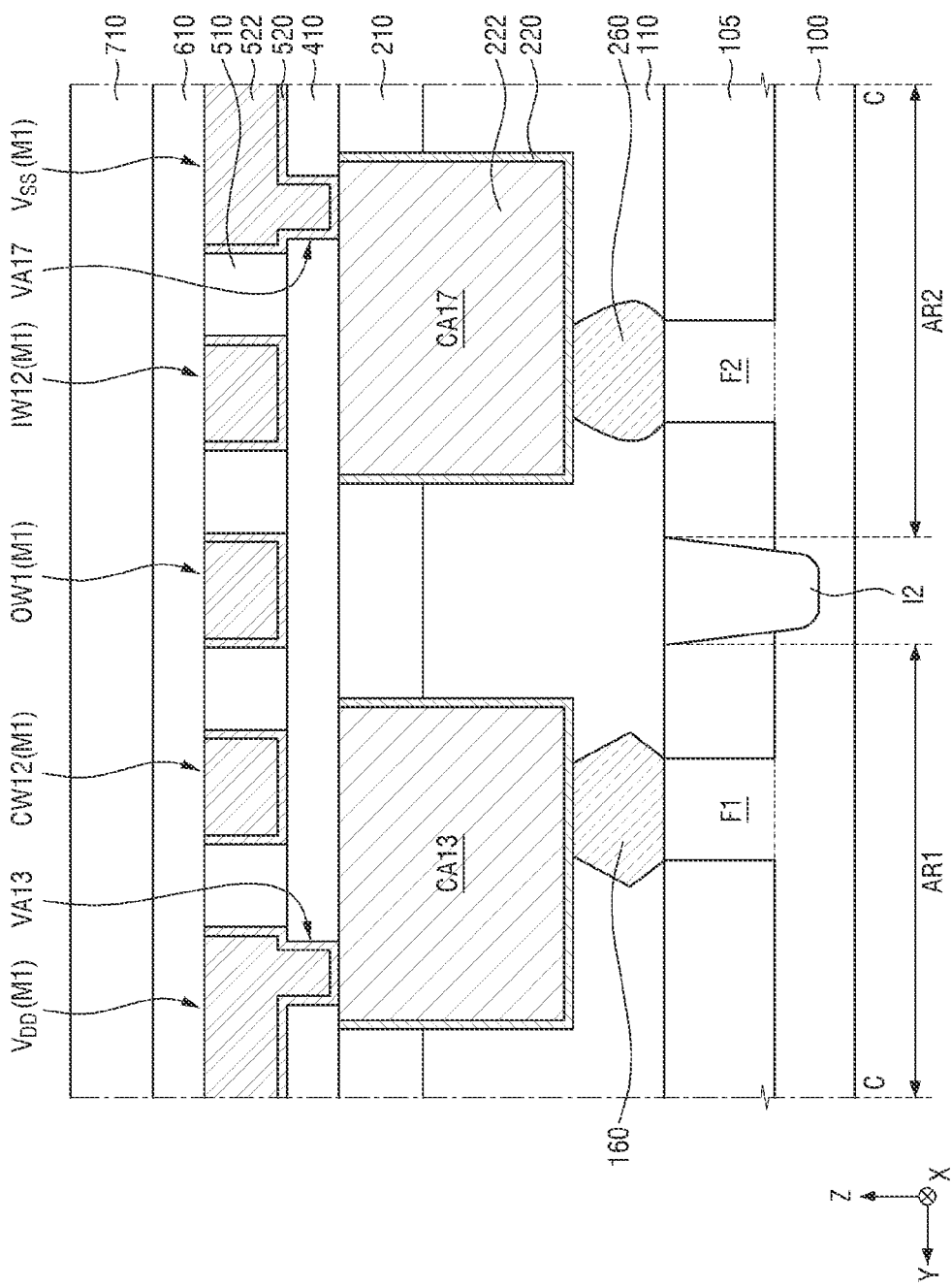
FIG. 5 is a cross-sectional view taken along line C-C of FIG. 2.

FIG. 2 is a plan view for explaining a semiconductor device according to some embodiments. FIG. 3 is a cross-sectional view taken along A-A of FIG. 2. FIG. 4 is a cross-sectional view taken along B-B of FIG. 2. FIG. 5 is a cross-sectional view taken along C-C of FIG. 2. The semiconductor device shown in FIGS. 2 to 5 may be an example of the semiconductor device that is implemented using the layout diagram of FIG. 1. For convenience of explanation, repeated parts of contents explained above using FIG. 1 will be only briefly explained (or omitted).

Although FIGS. 2 to 5 show a fin-type transistor FinFET including a channel region of a fin-type pattern as semiconductor device according to some embodiments, this is only an example. The semiconductor device according to some embodiments may, of course, include a tunneling transistor, a transistor including nanowire, a transistor including nanosheet, a VFET (Vertical FET), a CFET (Complementary FET) or a three-dimensional (3D) transistor. Further, the semiconductor device according to some embodiments of the present inventive concept may also include a bipolar junction transistor, a laterally diffused metal oxide semiconductor (LDMOS) transistor, and the like.

Referring to FIGS. 2 to 5, the semiconductor device according to some embodiment is formed on the substrate 100. The substrate 100 may be bulk silicon or SOI (silicon-on-insulator). In contrast, the substrate 100 may be a silicon substrate, or may include other materials, but are not limited to, for example, silicon germanium, SGOI (silicon germanium on insulator), indium antimonide, lead tellurium compounds, indium arsenide, indium phosphide, gallium arsenide or gallium antimonide.

The substrate 100 may include a first active region AR1 and a second active region AR2. In some embodiments, the first active region AR1 and the second active region AR2 may be separated by an element separation film I2. For example, as shown in FIGS. 4 and 5, the element separation film I2 may extend in the first direction X to separate the first active region AR1 and the second active region AR2.

A plurality of active patterns F1 and F2 may be formed on the substrate 100. For example, a first active pattern F1 may be formed on the first active region AR1, and a second active pattern F2 may be formed on the second active region AR2.

In some embodiments, the first and second active patterns F1 and F2 may each include a fin-type pattern protruding from the upper surface of the substrate 100.

The first and second active patterns F1 and F2 may be spaced part from each other and extend side by side. For example, the first and second active patterns F1 and F2 may each extend in the first direction X. In addition, the first and second active patterns F1 and F2 may be arranged side by side along the second direction Y.

The first and second cell separation patterns I1a and I1b may cross the first and second active patterns F1 and F2. The first and second cell separation patterns I1a and I1 b may define a first cell region CR1 across the first and second active patterns F1 and F2.

A field insulating film 105 may be formed on the substrate 100. In some embodiments, the field insulating film 105 may surround at least a part of the side surfaces of the first and second active patterns F1 and F2. For example, as shown in FIGS. 4 and 5, a part of the first and second active patterns F1 and F2 may protrude upward from the field insulating film 105. This field insulating film 105 may include, but is not limited to, for example, at least one of silicon oxide ($SiO_2$), silicon nitride (SiN), silicon oxynitride (SiON), silicon oxycarbonitride (SiOCN) or a combination thereof.

The first to third gate electrodes G1 to G3 may intersect the first and second active patterns F1 and F2, respectively. The first to third gate electrodes G1 to G3 may each include a gate conductive film 130. The gate conductive film 130 may include, but is not limited to, for example, at least one of Ti, Ta, W, Al, Co and a combination thereof. The gate conductive film 130 may also include, for example, silicon or silicon germanium (SiGe) besides metal.

The gate conductive film 130 is shown as a single film, but the technical idea of the present inventive concept is not limited thereto. Unlike that shown, the gate conductive film 130 may also be formed by stacking a plurality of conductive materials. For example, the gate conductive film 130 may include a work function adjusting film that adjusts the work function, and a filling conductive film that fills a space formed by the work function adjusting film. The work function adjusting film may include, for example, at least one of TiN, TaN, TiC, TaC, TiAlC and a combination thereof. The filling conductive film may include, for example, W or Al. Such a gate conductive film 130 may be formed through a replacement process, for example; however, other processes may also be used.

A gate dielectric film 120 may be interposed between the first and second active patterns F1 and F2 and the gate conductive film 130. For example, the gate dielectric film 120 may extend along the side walls and a bottom surface of the gate conductive film 130. However, the technical idea of the present inventive concept is not limited thereto, and the gate dielectric film 120 may extend only along the bottom surface of the gate conductive film 130. In some embodiments, a part of the gate dielectric film 120 may be interposed between the field insulating film 105 and the gate conductive film 130. For example, as shown in FIG. 4, the gate dielectric film 120 may further extend along the upper surface of the field insulating film 105.

The gate dielectric film 120 may include, for example, at least one of silicon oxide, silicon oxynitride, silicon nitride, and high dielectric constant (high-k) material having a higher dielectric constant than silicon oxide. The high dielectric constant material may include, but is not limited to, for example, hafnium oxide.

The gate spacer 140 may be formed on the substrate 100 and the field insulating film 105. The gate spacer 140 may extend along both sides of the gate conductive film 130. For example, the gate spacer 140 may extend in the second direction Y and intersect the first and second active patterns F1 and F2. The gate spacer 140 may include at least one of silicon oxide, silicon nitride, silicon oxynitride, and combinations thereof, for example.

A gate capping pattern 150 may extend along the upper surface of the gate conductive film 130. For example, the gate capping pattern 150 may extend in the second direction Y to cover the upper surface of the gate conductive film 130.

A first source/drain region 160 may be formed on the first active region AR1. For example, the first source/drain region 160 may be formed inside the first active pattern F1 on both sides of the gate conductive film 130. The first source/drain region 160 may be spaced apart from the gate conductive film 130 by the gate spacer 140. A second source/drain region 260 may be formed on the second active region AR2. For example, the second source/drain region 260 may be formed inside the second active pattern F2 on both sides of the gate conductive film 130. The second source/drain region 260 may be spaced apart from the gate conductive film 130 by the gate spacer 140. In some embodiments, each of the first source/drain region 160 and the second source/drain region 260 may include an epitaxial layer formed inside the first and second active patterns F1 and F2.

When the semiconductor device formed in the first active region AR1 is a PFET, the first source/drain region 160 may include p-type impurities or impurities for preventing diffusion of p-type impurities. For example, the first source/drain region 160 may include at least one of B, C, In, Ga, and Al or a combination thereof. In contrast, when the semiconductor device formed in the second active region AR2 is an NFET, the second source/drain region 260 may include n-type impurities or impurities for preventing the diffusion of n-type impurities. For example, the second source/drain region 260 may include at least one of P, Sb, As, or a combination thereof.

The first source/drain region 160 and the second source/drain region 260 are each shown as a single film, but the technical idea of the present inventive concept is not limited thereto. For example, the first source/drain region 160 and the second source/drain region 260 may be formed of multi-layered films, with each including impurities having different concentrations from each other.

A plurality of interlayer insulating films 110, 210, 410, 510, 610, and 710 may be formed on the substrate 100. The interlayer insulating films 110, 210, 410, 510, 610, and 710 may include, but are not limited to, for example, at least one of silicon oxide, silicon nitride, silicon oxynitride and a low dielectric constant (low-k) material having a lower dielectric constant than silicon oxide.

The first interlayer insulating film 110 and the second interlayer insulating film 210 may be formed to cover the field insulating film 105, the first source/drain region 160, the second source/drain region 260, the gate spacer 140, and the gate capping pattern 150. For example, the first interlayer insulating film 110 may cover the upper surface of the field insulating film 105, the upper surface of the first source/drain region 160, the upper surface of the second source/drain region 260, and the side surfaces of the gate spacer 140. The second interlayer insulating film 210 may cover the upper surface of the gate capping pattern 150 and the upper surface of the first interlayer insulating film 110.

The source/drain contacts CA11 to CA17 may penetrate the first interlayer insulating film 110 and the second interlayer insulating film 210, and be connected to the first source/drain region 160 or the second source/drain region 260. For example, the first to fourth source/drain contacts CA11 to CA14 may be connected to the first source/drain region 160, and the fourth to seventh source/drain contacts CA14 to CA17 may be connected to the second source/drain region 260.

The gate contacts CB11 to CB13 may penetrate the first interlayer insulating film 110, the second interlayer insulating film 210, and the fourth interlayer insulating film 410, and be connected to the gate conductive film 130. For example, the first gate contact CB11 may be connected to the gate conductive film 130 of the first gate electrode G1, the second gate contact CB12 may be connected to the gate conductive film 130 of the second gate electrode G2, and the third gate contact CB13 may be connected to the gate conductive film 130 of the third gate electrode G3.

The first contact vias VA11 to VA17 may penetrate the fourth interlayer insulating film 410 and be connected to the source/drain contacts CA11 to CA17 to correspond to them. In some embodiments, the upper surfaces of the first contact vias VA11 to VA17 and the upper surfaces of the gate contacts CB11 to CB13 may be placed on the same plane. For example, as shown in FIG. 3, the upper surface of the second via pattern VA12 and the upper surface of the third gate contact CB13 may be placed on the same plane as the upper surface of the fourth interlayer insulating film 410.

The first routing wirings IW11, IW12, CW11, CW12, and OW1 may each extend in the first direction X. In some embodiments, the first routing wirings IW11, IW12, CW11, CW12, and OW1 may be placed at a level (i.e., a first routing level M1) that is higher than those of the source/drain contacts CA11 to CA17, the first contact vias VA11 to VA17, and the gate contacts CB11 to CB13. For example, the first routing wirings IW11, IW12, CW11, CW12, and OW1 may be placed inside the fifth interlayer insulating film 510.

In some embodiments, the first routing wirings IW11, IW12, CW11, CW12, and OW1 may each be connected to some of the first contact vias VA11 to VA17 or some of the gate contacts CB11 to CB13. For example, the first wiring pattern IW11 may be connected to the upper surface of the first gate contact CB11, the second wiring pattern IW12 may be connected to the upper surface of the second gate contact CB12, the third wiring pattern CW11 may be connected to the upper surface of the fifth via pattern VA15, the fourth wiring pattern CW12 may be connected to the upper surface of the second via pattern VA12 and the upper surface of the third gate contact CB13, and the fifth wiring pattern OW1 may be connected to the upper surface of the fourth via pattern VA14.

The first power supply wiring $V_{DD}$ and the second power supply wiring $V_{SS}$ may each extend in the first direction X. In some embodiments, the first power supply wiring $V_{DD}$ and the second power supply wiring $V_{SS}$ may be placed at a level (i.e., the first routing level M1) that is higher than those of the source/drain contacts CA11 to CA17, the first contact vias VA11 to VA17, and the gate contacts CB11 to CB13. For example, the first power supply wiring $V_{DD}$ and the second power supply wiring $V_{SS}$ may be placed inside the fifth interlayer insulating film 510.

In some embodiments, the first power supply wiring $V_{DD}$ and the second power supply wiring $V_{SS}$ may each be connected to some of the first contact vias VA11 to VA17. For example, the first power supply wiring $V_{DD}$ may be connected to the upper surface of the third via pattern VA13, and the second power supply wiring $V_{SS}$ may be connected to the upper surface of the seventh via pattern VA17.

The first routing via V1a and the second routing via V1b each penetrate the sixth interlayer insulating film 610, and may be connected to the first routing wirings IW11, IW12, CW11, CW12, and OW1. For example, the first routing via V1a may be connected to the upper surface of the third wiring pattern CW11, and the second routing via V1b may be connected to the upper surface of the fourth routing pattern CW12.

The second routing wiring DW1 may extend in the second direction Y. In some embodiments, the second routing wiring DW1 is placed at a level (i.e., a second routing level M2) that is higher than those of the first routing wirings IW11, IW12, CW11, CW12, and OW1. For example, the second routing wiring DW1 may be placed inside the seventh interlayer insulating film 710. And, the second routing wiring DW1 may be connected to the first routing via V1a and the second routing via V1b. For example, the second routing wiring DW1 may be connected to the upper surface of the first routing via V1a and the upper surface of the second routing via V1b.

In some embodiments, the source/drain contacts CA11 to CA17, the first contact vias VA11 to VA17, the gate contacts CB11 to CB13, the first power supply wiring $V_{DD}$, the second power supply wiring $V_{SS}$, the first routing wirings IW11, IW12, CW11, CW12, and OW1, the routing vias V1a and V1b, and the second routing wiring DW1 may each include barrier films 220, 230, 520, and 720, and filling films 222, 232, 522, and 722. The barrier films 220, 230, 520, and 720 may extend along the surfaces of the interlayer insulating films 110, 210, 410, 510, 610, and 710. The filling films 222, 232, 522, and 722 may fill a space formed by the barrier films 220, 230, 520, and 720.

The barrier films 220, 230, 520, and 720 may include a metal or metal nitride for preventing diffusion of the filling films 222, 232, 522, and 722. For example, the barrier films 220, 230, 520, and 720 may include, but are not limited to, at least one of titanium (Ti), tantalum (Ta), tungsten (W), nickel (Ni), cobalt (Co), platinum (Pt), alloys thereof, and nitrides thereof.

The filling films 222, 232, 522, and 722 may include, but are not limited to, at least one of aluminum (Al), copper (Cu), tungsten (W), molybdenum (Mo), cobalt (Co) and alloys thereof.

Although the first contact vias VA11 to VA17, the first power supply wiring $V_{DD}$, the second power supply wiring $V_{SS}$, the first routing wirings IW11, IW12, CW11, CW12, and OW1, the routing vias V1a and V1b, and the second routing wiring DW1 are shown as only being formed by the dual damascene process, this is only an example, and they may of course be formed by a single damascene process or other wiring process.

Figure 6:
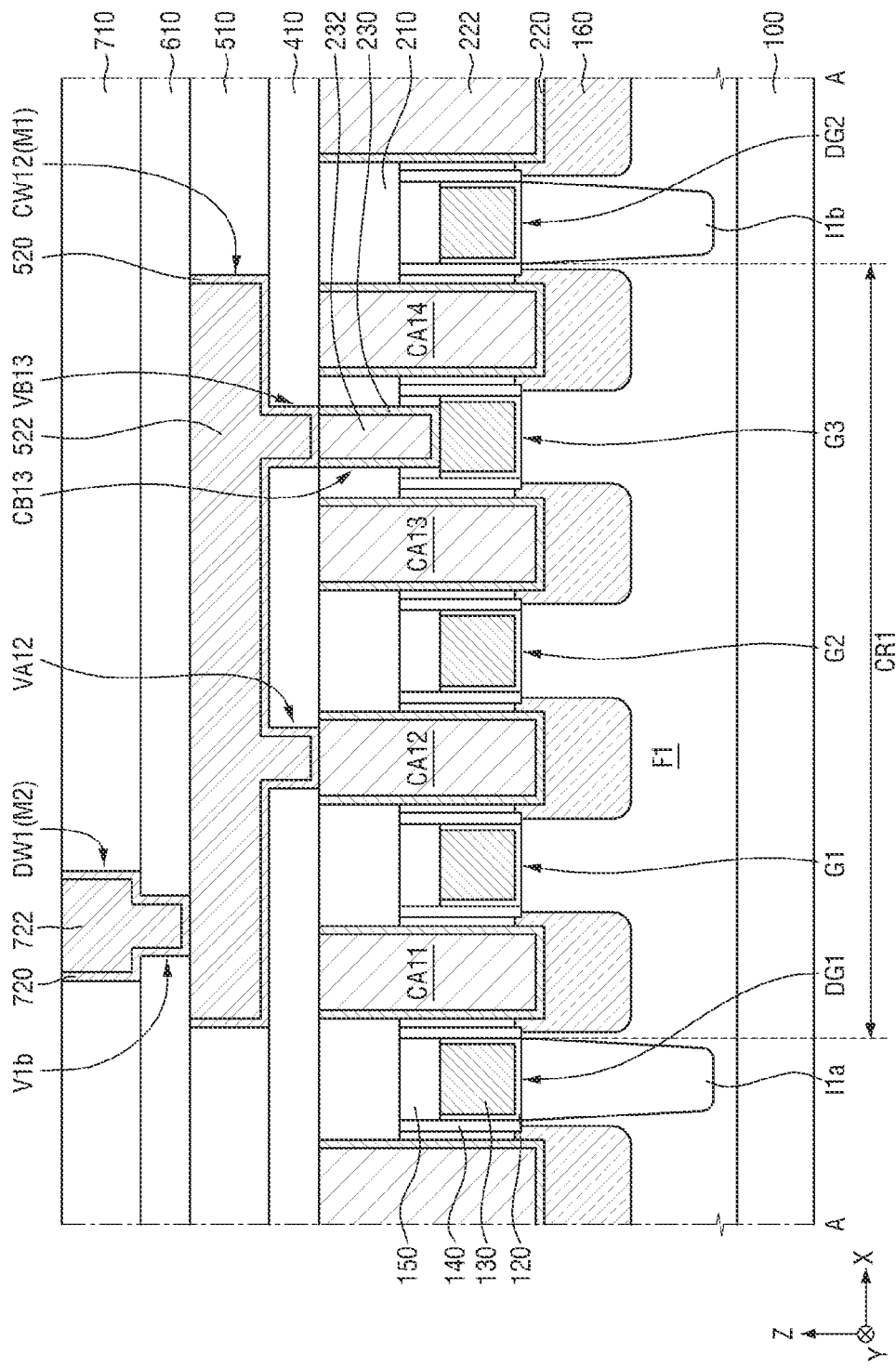
FIGS. 6 to 8 are various other cross-sectional views taken along line A-A of FIG. 2.
Figure 7:
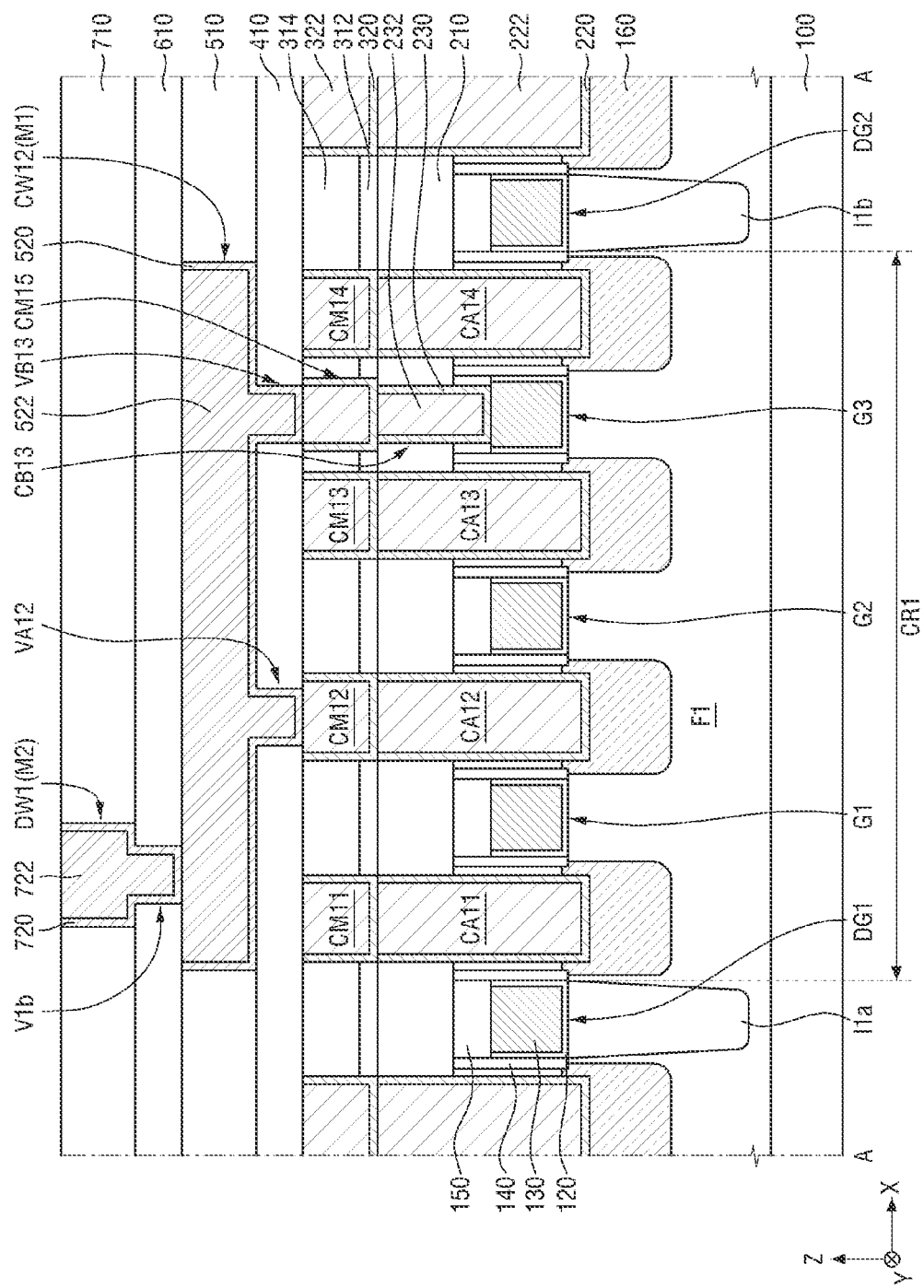
Figure 8:
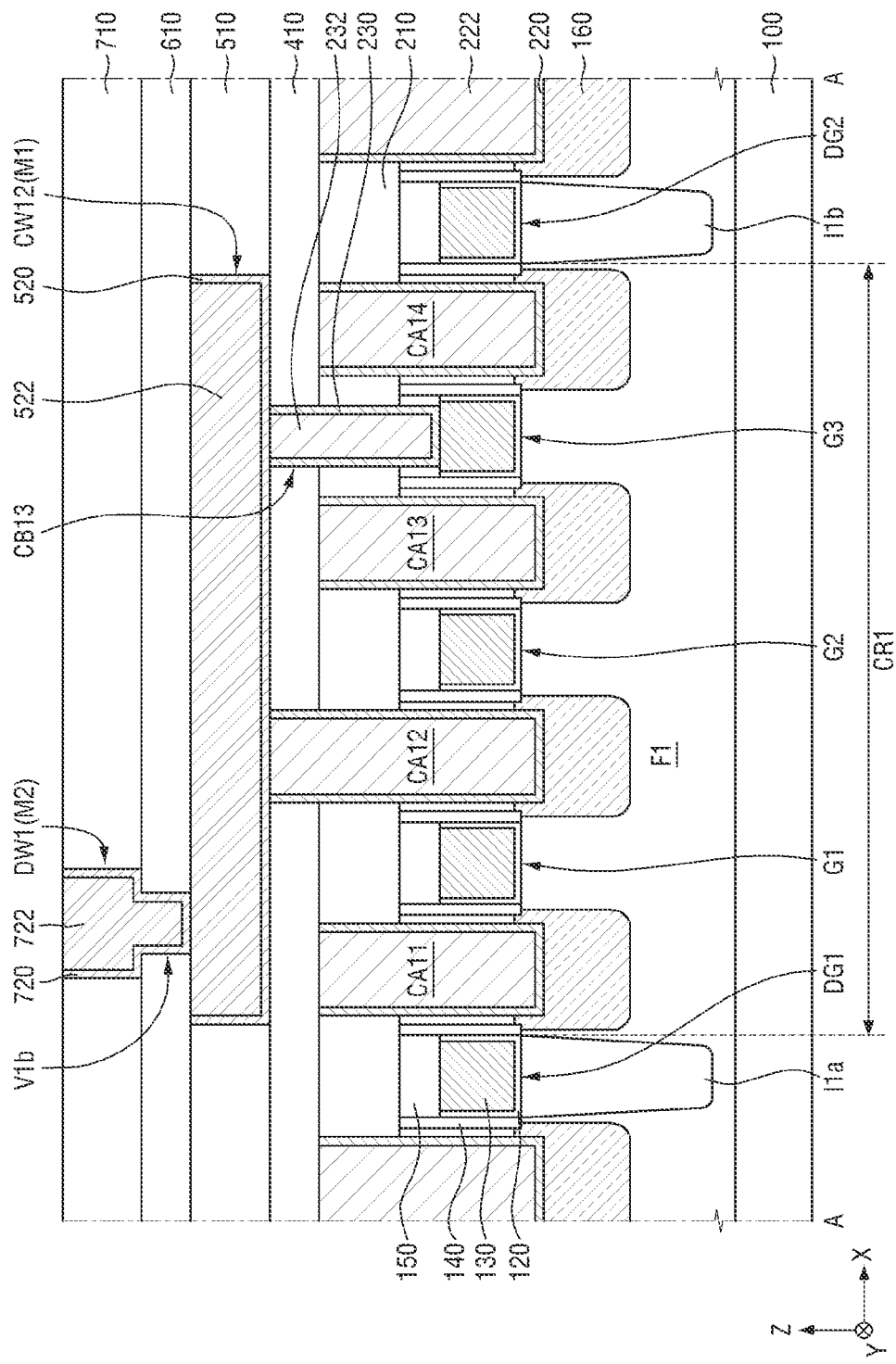

FIGS. 6 to 8 are various other cross-sectional views taken along A-A of FIG. 2. For convenience of explanation, repeated parts of contents explained above using FIGS. 1 to 5 will be briefly explained or omitted. Referring to FIG. 6, the semiconductor device according to some embodiments further includes a second contact via VB13. The second contact via VB13 may penetrate the fourth interlayer insulating film 410 and be connected to the gate contacts CB11 to CB13 to correspond to them. The second contact via VB13 may connect the gate contacts CB11 to CB13 and the first routing wirings IW11, IW12, CW11, CW12, and OW1. As an example, as shown, the second contact via VB13 may connect the third gate contact CB13 and the fourth wiring pattern CW12.

In some embodiments, the upper surfaces of the source/drain contacts CA11 to CA17 and the upper surfaces of the gate contacts CB11 to CB13 may be placed on the same plane. As an example, as shown, the upper surface of the second source/drain contact CA12 and the upper surface of the third gate contact CB13 may be placed on the same plane as the upper surface of the second interlayer insulating film 210. In some embodiments, the upper surfaces of the first contact vias VA11 to VA17 and the upper surface of the second contact via VB13 may be placed on the same plane. As an example, as shown, the upper surface of the second via pattern VA12 and the upper surface of the second contact via VB13 may be placed on the same plane as the upper surface of the fourth interlayer insulating film 410.

Referring to FIG. 7, the semiconductor device according to some embodiments further includes connecting contacts CM11 to CM15. Each of these connecting contacts CM11 to CM15 may be connected to some of the source/drain contacts CA11 to CA17 or some of the gate contacts CB11 to CB13. For example, a third interlayer insulating film 314 that covers the second interlayer insulating film 210 may be formed. Each of the connecting contacts CM11 to CM15 penetrates the third interlayer insulating film 314, and may be connected to some of the source/drain contacts CA11 to CA17 or some of the gate contacts CB11 to CB13.

The connecting contacts CM11 to CM15 may connect the source/drain contacts CA11 to CA17 and the first contact vias VA11 to VA17, or may connect the gate contacts CB11 to CB13 and the second contact via VB13. As an example, as shown, the second connecting contact CM12 may connect the second source/drain contact CA12 and the second via pattern VA12, and may the fifth connecting contact CM15 may connect the third gate contact CB13 and the second contact via VB13.

In some embodiments, a liner film 312 may be further formed between the second interlayer insulating film 210 and the third interlayer insulating film 314. The liner film 312 may prevent the second interlayer insulating film 210 from being damaged in the process of forming the connecting contacts CM11 to CM15. The liner film 312 may include, but is not limited to, for example, at least one of silicon oxide, silicon nitride, silicon oxynitride, silicon carbide, silicon oxycarbonitride, aluminum nitride (AlN), or a combination thereof. The liner film 312 is shown as a single film, but the technical idea of the present inventive concept is not limited thereto. Unlike that shown, the liner film 312 may also be formed by stacking a plurality of insulating materials.

In some embodiments, the connecting contacts CM11 to CM15 may include a barrier film 320 and a filling film 322. The barrier film 320 may include a metal or metal nitride for preventing diffusion of the filling film 322.

Referring to FIG. 8, in the semiconductor device according to some embodiments, the source/drain contacts CA11 to CA17 are directly connected to the first routing wirings IW11, IW12, CW11, CW12, and OW1. For example, the source/drain contacts CA11 to CA17 penetrate the first interlayer insulating film 110, the second interlayer insulating film 210, and the fourth interlayer insulating film 410, and may be connected to the first source/drain region 160 or the second source/drain region 260. As an example, as shown, the second source/drain contact CA12 may be directly connected to the fourth wiring pattern CW12.

Figure 9:
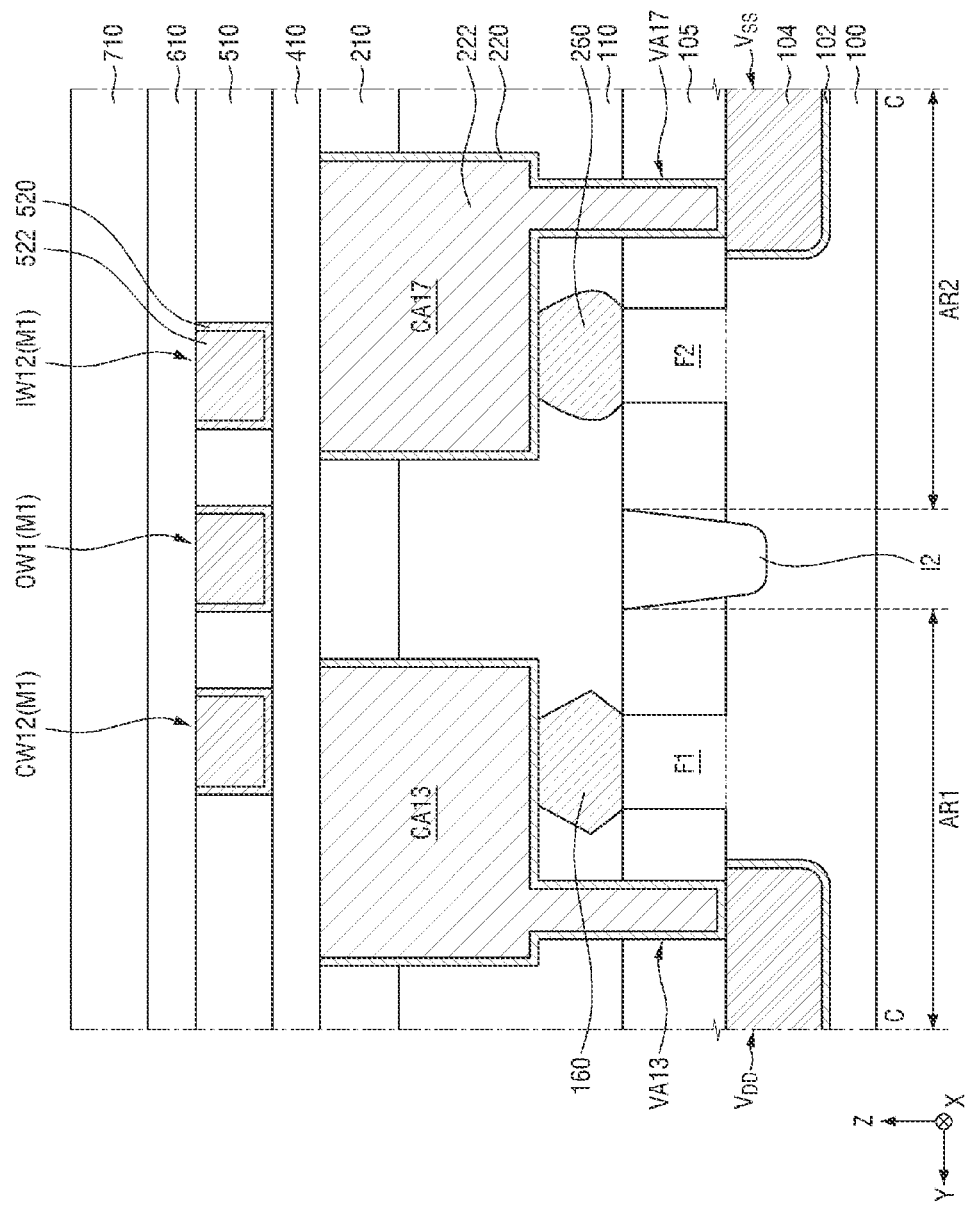
FIG. 9 is another cross-sectional view taken along line C-C of FIG. 2.

FIG. 9 is another cross-sectional view taken along C-C of FIG. 2. For convenience of explanation, repeated parts of contents explained above using FIGS. 1 to 5 will be briefly explained or omitted. Referring to FIG. 9, at least a part of the first power supply wiring $V_{DD}$ and at least a part of the second power supply wiring $V_{SS}$ are buried in the substrate 100.

For example, the substrate 100 may include trenches that are spaced apart from each other and extend in the first direction X side by side. The first power supply wiring $V_{DD}$ and the second power supply wiring $V_{SS}$ may be buried in the trenches. In some embodiments, the first via pattern VA11 and the third via pattern VA13 may penetrate the first interlayer insulating film 110 and the field insulating film 105. As a result, the first power supply wiring $V_{DD}$ buried in the substrate 100 may be connected to the first source/drain contact CA11 and the third source/drain contact CA13.

In some embodiments, the seventh via pattern VA17 may penetrate the first interlayer insulating film 110 and the field insulating film 105. As a result, the second power supply wiring $V_{SS}$ buried in the substrate 100 may be connected to the seventh source/drain contact CA17.

In some embodiments, a substrate insulating film 102 may be interposed between the first power supply wiring $V_{DD}$ and the substrate 100, and between the second power supply wiring $V_{SS}$ and the substrate 100. The substrate insulating film 102 may electrically separate the first power supply wiring $V_{DD}$ and the second power supply wiring $V_{SS}$ from the substrate 100. The substrate insulating film 102 may include, but is not limited to, for example, at least one of silicon oxide ($SiO_2$), silicon nitride (SiN), silicon oxynitride (SiON), silicon oxycarbonitride (SiOCN), or a combination thereof.

Figure 10:
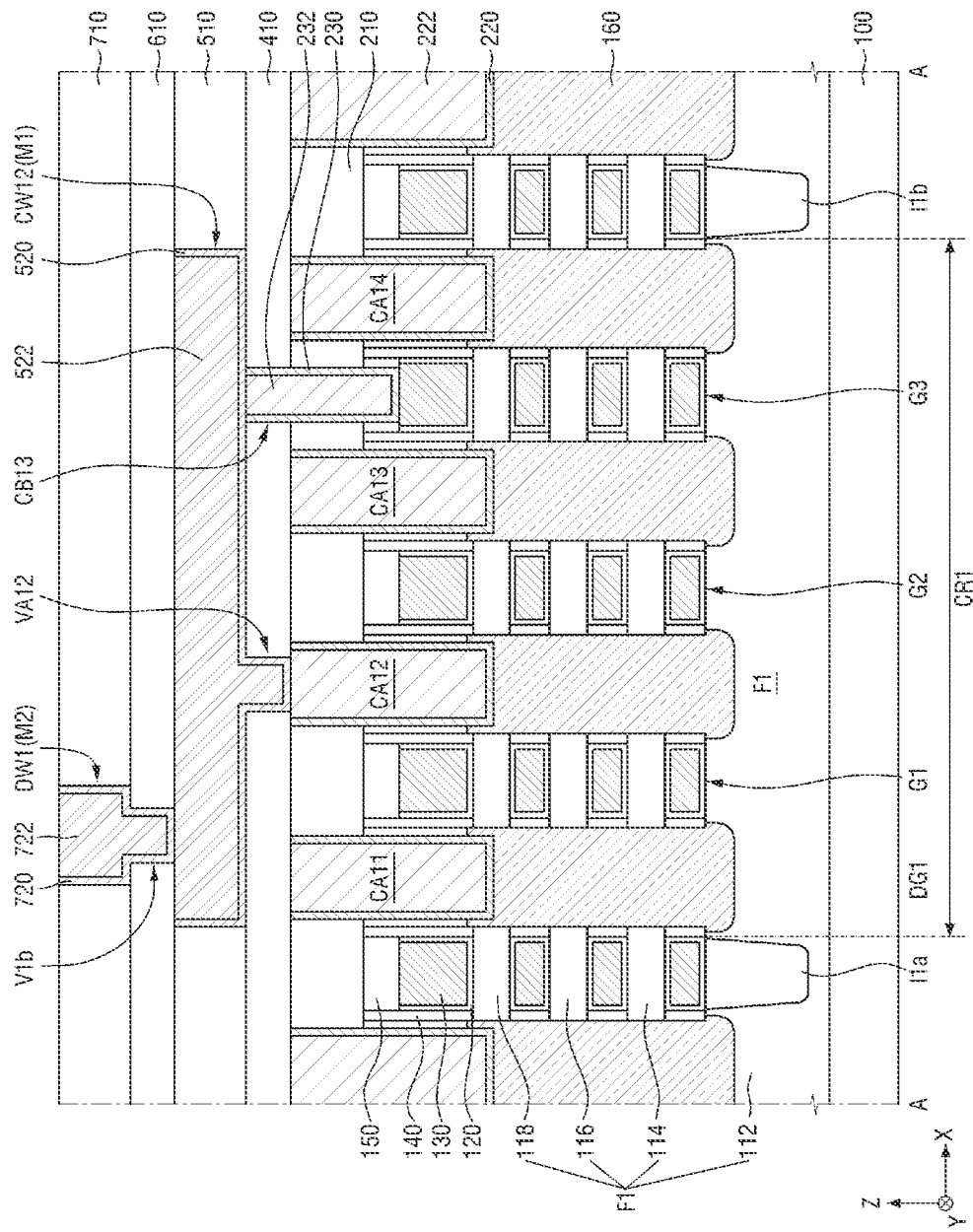
FIGS. 10 and 11 are cross-sectional views for explaining a semiconductor device according to some embodiments.
Figure 11:
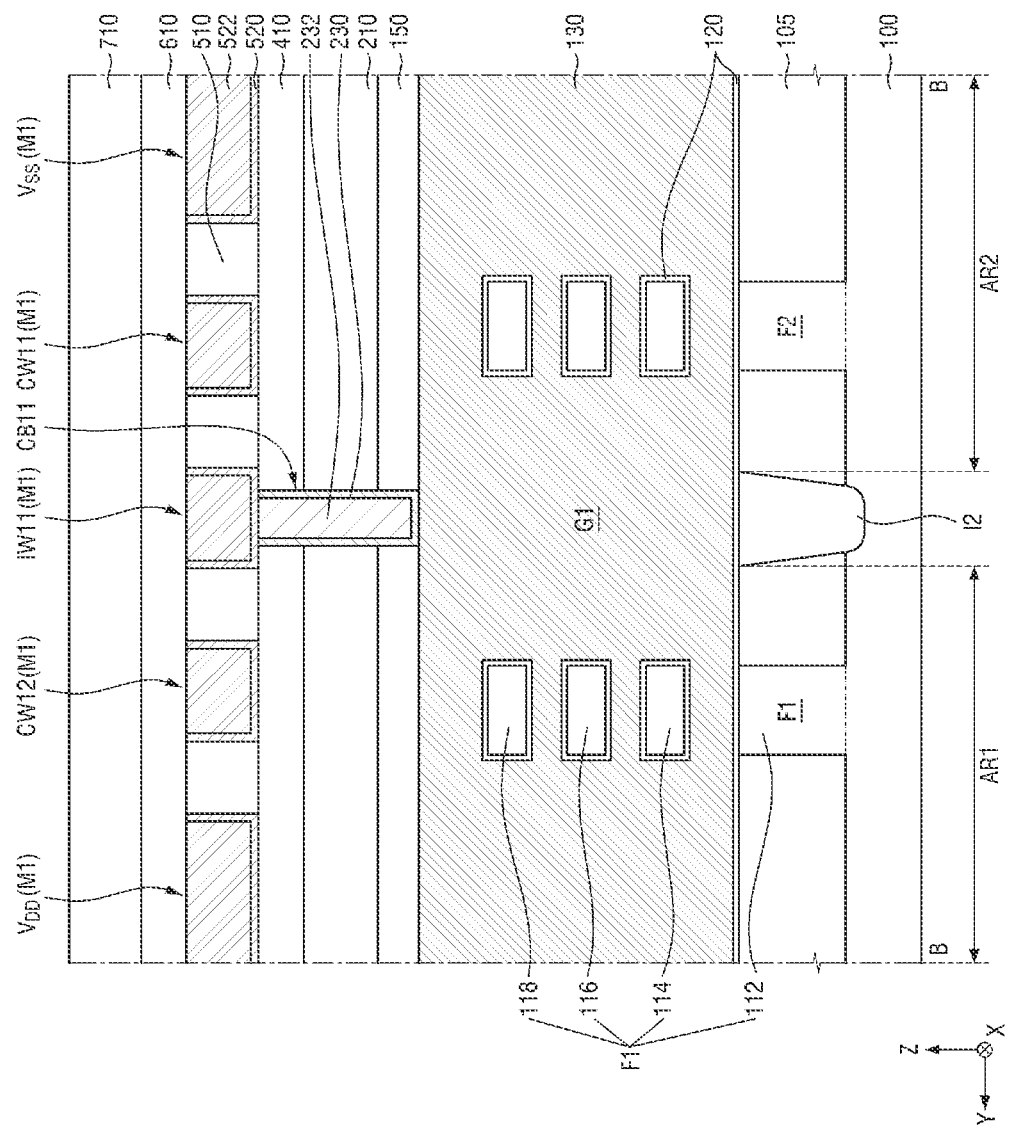

FIGS. 10 and 11 are cross-sectional views for explaining a semiconductor device according to some embodiments. For convenience of explanation, repeated parts of contents explained above using FIGS. 1 to 5 will be briefly explained or omitted. Referring to FIGS. 10 and 11, in the semiconductor device according to some embodiments, each of the first and second active patterns F1 and F2 may include a plurality of wire patterns 114, 116, and 118. For example, each of the first and second active patterns F1 and F2 may include first, second and third wire patterns 114, 116, and 118 that are stacked on the substrate 100 sequentially, and spaced apart from each other. For example, the first wire pattern 114 may be spaced apart from the substrate 100 in the third direction Z, the second wire pattern 116 may be spaced apart from the first wire pattern 114 in the third direction Z, and the third wire pattern 118 may be spaced apart from the second wire pattern 116 in the third direction Z.

Each of the first to third wire patterns 114, 116, and 118 may extend in the first direction X. Further, each of the first to third wire patterns 114, 116, and 118 may penetrate the first to third gate electrodes G1 to G3. As a result, as shown in FIG. 11, the first to third gate electrodes G1 to G3 may surround the outer peripheral surfaces of the first to third wire patterns 114, 116, and 118. As shown by FIG. 11, although the cross sections of the first to third wire patterns 114, 116, and 118 are each shown as a rectangular shape, this is only an example. For example, each of the cross sections of the first to third wire patterns 114, 116, and 118 may be other polygons or circles, for example. In some embodiments, the first and second active patterns F1 and F2 may each have a fin-type pattern 112 that protrudes from the upper surface of the substrate 100 and extends in the first direction X. The first wire pattern 114 may be spaced apart from, for example, the fin-type pattern 112 in the third direction Z.

Figure 12:
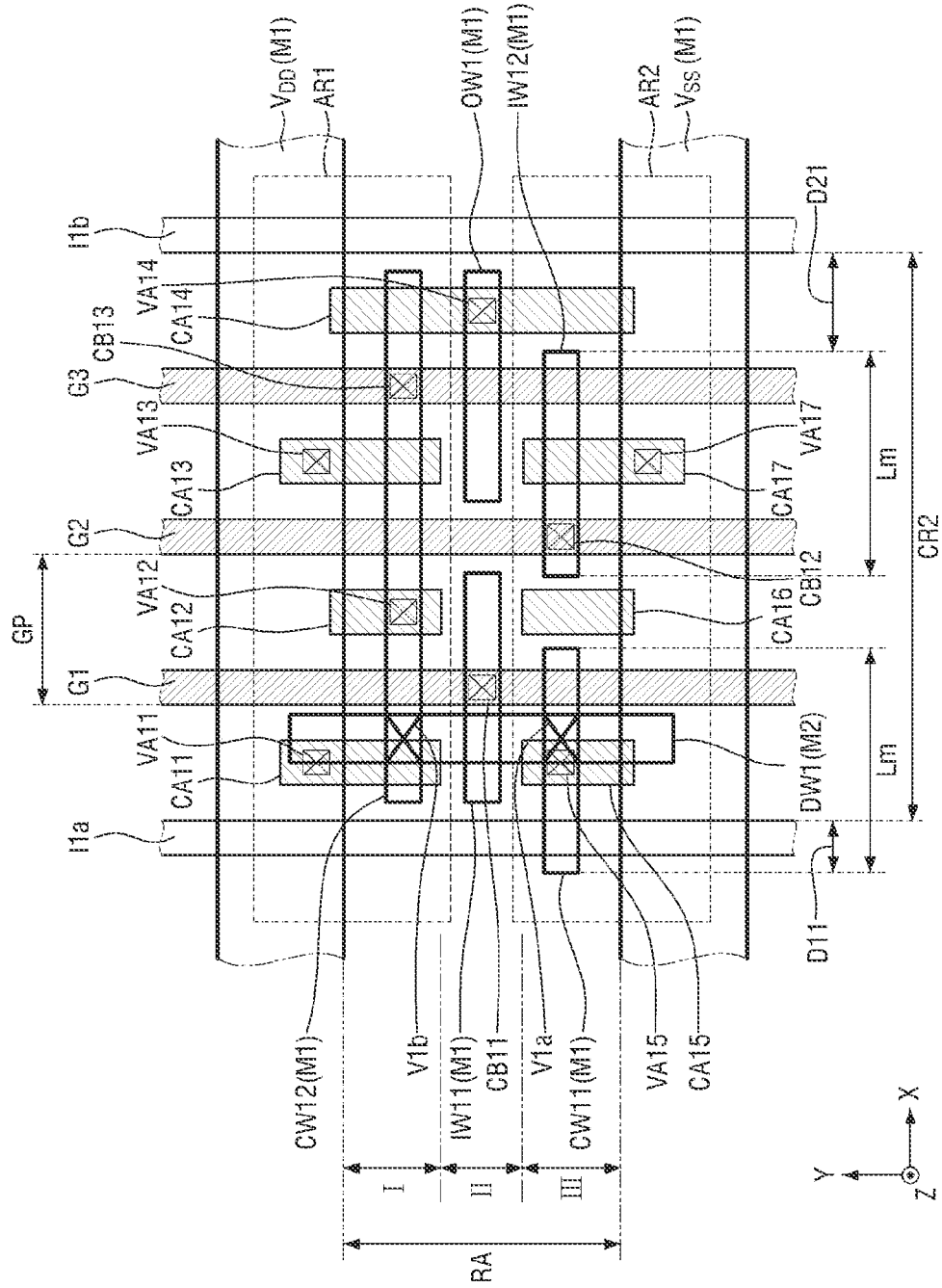
FIGS. 12 and 13 are layout diagrams for showing a semiconductor device according to some embodiments.
Figure 13:
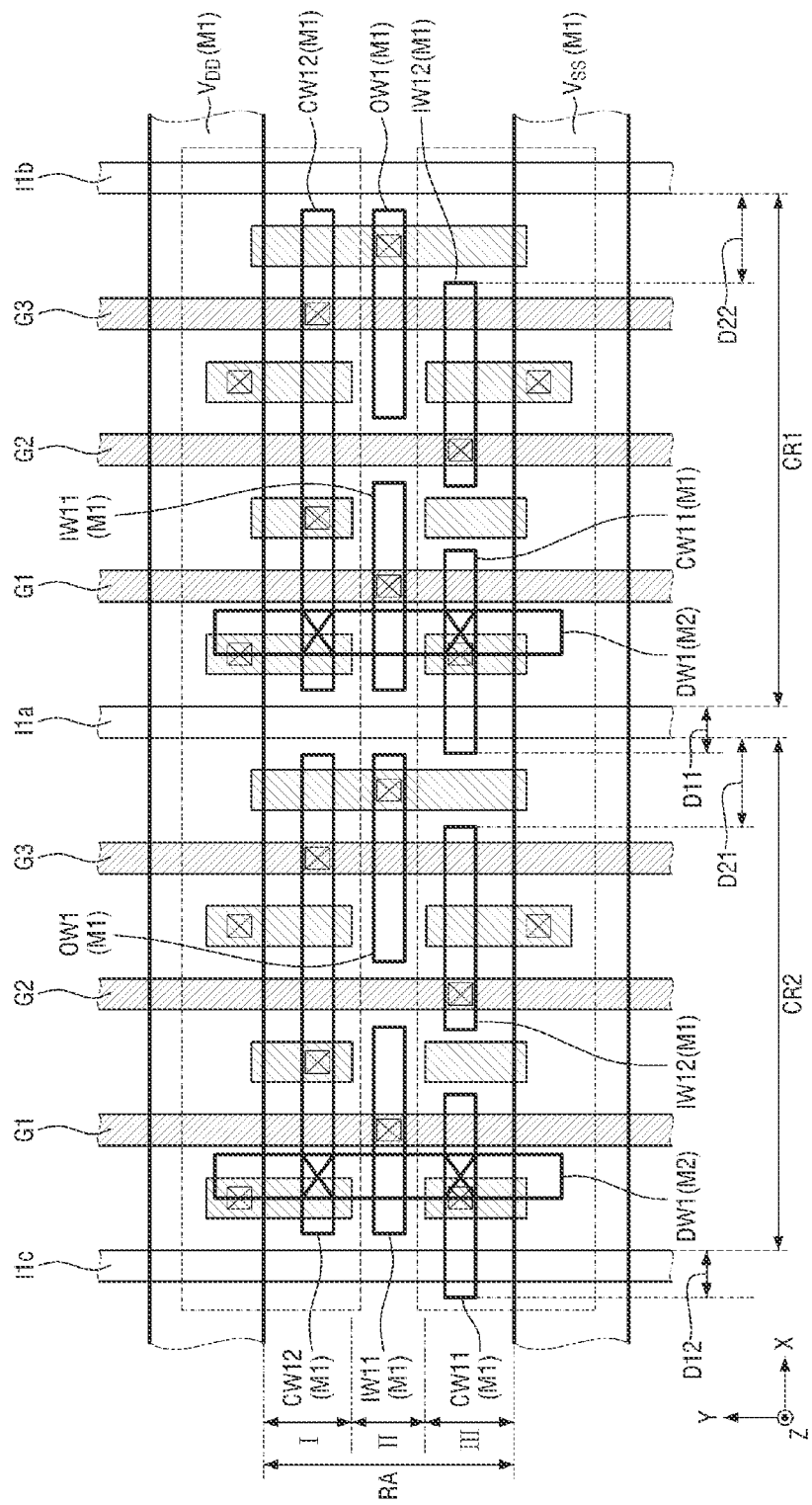

FIGS. 12 and 13 are layout diagrams for showing a semiconductor device according to some embodiments. For convenience of explanation, repeated parts of contents explained above using FIGS. 1 to 5 will be briefly explained or omitted. Referring to FIGS. 12 and 13, the semiconductor device according to some embodiments further includes a second cell region CR2.

A standard cell provided by the cell library may be provided inside the second cell region CR2. In FIGS. 12 and 13, the standard cell provided in the second cell region CR2 is a 2-input AND (AND2) cell. As an example, the semiconductor device provided in the second cell region CR2 may include the first and second active regions AR1 and AR2, the first to third gate electrodes G1 to G3, the source/drain contacts CA11 to CA17, the first contact vias VA11 to VA17, the gate contacts CB11 to CB13, the first and second power supply wirings $V_{DD}$ and $V_{SS}$, the first routing wirings IW11, IW12, CW11, CW12, and OW1, and the second routing wiring DW1 that are described above.

The first cell region CR1 and the second cell region CR2 may be arranged along the first direction X. The second cell region CR2 may be adjacent to the first cell region CR1. In some embodiments, the second cell region CR2 may be defined by a first cell separation pattern I1a and a third cell separation pattern I1c arranged along the first direction X.

In some embodiments, at least some of the first routing wirings IW11, IW12, CW11, CW12, and OW1 of the second cell region CR2 may retract from the boundary of the second cell region CR2. FIGS. 12 and 13 show, as an example, that the second wiring pattern IW12 retracts from the boundary of the second cell region CR2. Specifically, the second wiring pattern IW12 may retract from the boundary of the second cell region CR2 extending in the second direction Y. In some embodiments, the second wiring pattern IW12 may not overlap the fourth source/drain contact CA14.

The first routing wirings IW11, IW12, CW11, CW12, and OW1 of the second cell region CR2 may provide a space for the first routing wirings IW11, IW12, CW11, CW12, and OW1 of the first cell region CR1. For example, the second wiring pattern IW12 of the second cell region CR2 that retracts from the boundary of the second cell region CR2 may provide a space for the third wiring pattern CW11 of the first cell region CR1 that protrudes from the boundary of the first cell region CR1. More specifically, the third wiring pattern CW11 of the first cell region CR1 may extend in the first direction X over the first cell region CR1 and the second cell region CR2. According, it is possible to provide a semiconductor device capable of securing efficient PnR resources with small unit cell size, and capable of meeting fabrication/process requirements associated with appropriate design rules checking (DRC) design tools.

In some embodiments, the second wiring pattern IW12 retracting from the boundary of the first cell region CR1 may be close to the minimum wiring length according to the defined design rules. As an example, a length Lm of the second wiring pattern IW12 extending in the first direction X may be 2 gate pitches GP or less.

A length D21 of the second wiring pattern IW12 retracting from the boundary of the first cell region CR1 may vary, depending on the placement of the second wiring pattern IW12. As an example, the length D21 of the second wiring pattern IW12 retracting from the boundary of the first cell region CR1 may be 0.5 gate pitch GP or more. Alternatively, as an example, the length D21 of the second wiring pattern IW12 retracting from the boundary of the first cell region CR1 may be one gate pitch GP or more or 1.5 gate pitches GP or more.

In some embodiments, at least some of the first routing wirings IW11, IW12, CW11, CW12, and OW1 of the first cell region CR1 may retract from the boundary of the first cell region CR1. As an example, the second wiring pattern IW12 of the first cell region CR1 may retract by D22 from the boundary of the first cell region CR1. Although D22 is shown as only being the same as D21, this is only an example, and D22 may of course be smaller or greater than D21.

In some embodiments, at least some of the first routing wirings IW11, IW12, CW11, CW12, and OW1 of the second cell region CR2 may protrude from the boundary of the second cell region CR2. As an example, the third wiring pattern CW11 of the second cell region CR2 may protrude by D12 from the boundary of the second cell region CR2. Although D12 is shown as only being the same as D11, this is only an example, and D12 may of course be smaller or greater than D11.

Accordingly, as described hereinabove and illustrated by the side-by-side two-input AND cells CR1, CR2 within FIG. 13, for example, a first logic gate (e.g., AND2 within CR1) is defined within a first unit cell footprint on a semiconductor substrate. This first unit cell footprint is illustrated as the width of CR1 in the X-direction. A first wiring pattern (e.g., CW11 (M1)) is provided, which extends in a first direction (e.g., X-direction) across a portion of the first unit cell footprint (e.g., across the first cell separation pattern I1a), by an amount equal to D11. The first wiring pattern is electrically connected to at least one of a gate electrode and a source/drain region within the first logic gate, and has: (i) a first terminal end within a perimeter of the first unit cell footprint (e.g., within CR1), and (ii) a second terminal end, which extends outside the perimeter of the first unit cell footprint (i.e., into CR2). This second terminal end is patterned so that it is not electrically connected to any current carrying region of any semiconductor device that is located outside the perimeter of the first unit cell footprint (i.e., any device within CR2). Nonetheless, and advantageously, a length of the first wiring pattern CW11 (M1) is equivalent to a minimum allowable length thereof, as defined by a corresponding layout design rule associated with the first logic device (and verified by a design rule checking (DRC) algorithm associated with a corresponding method of fabrication).

Figure 14:
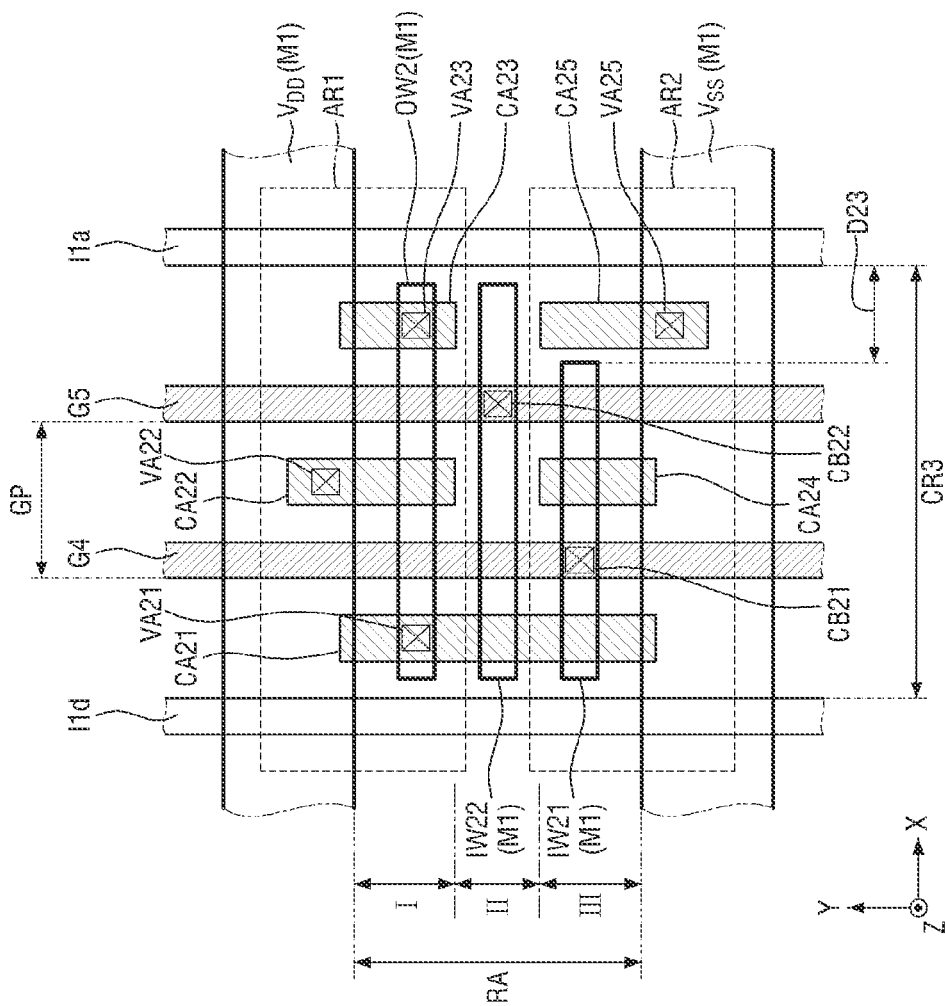
FIGS. 14 and 15 are layout diagrams for showing a semiconductor device according to some embodiments.
Figure 15:
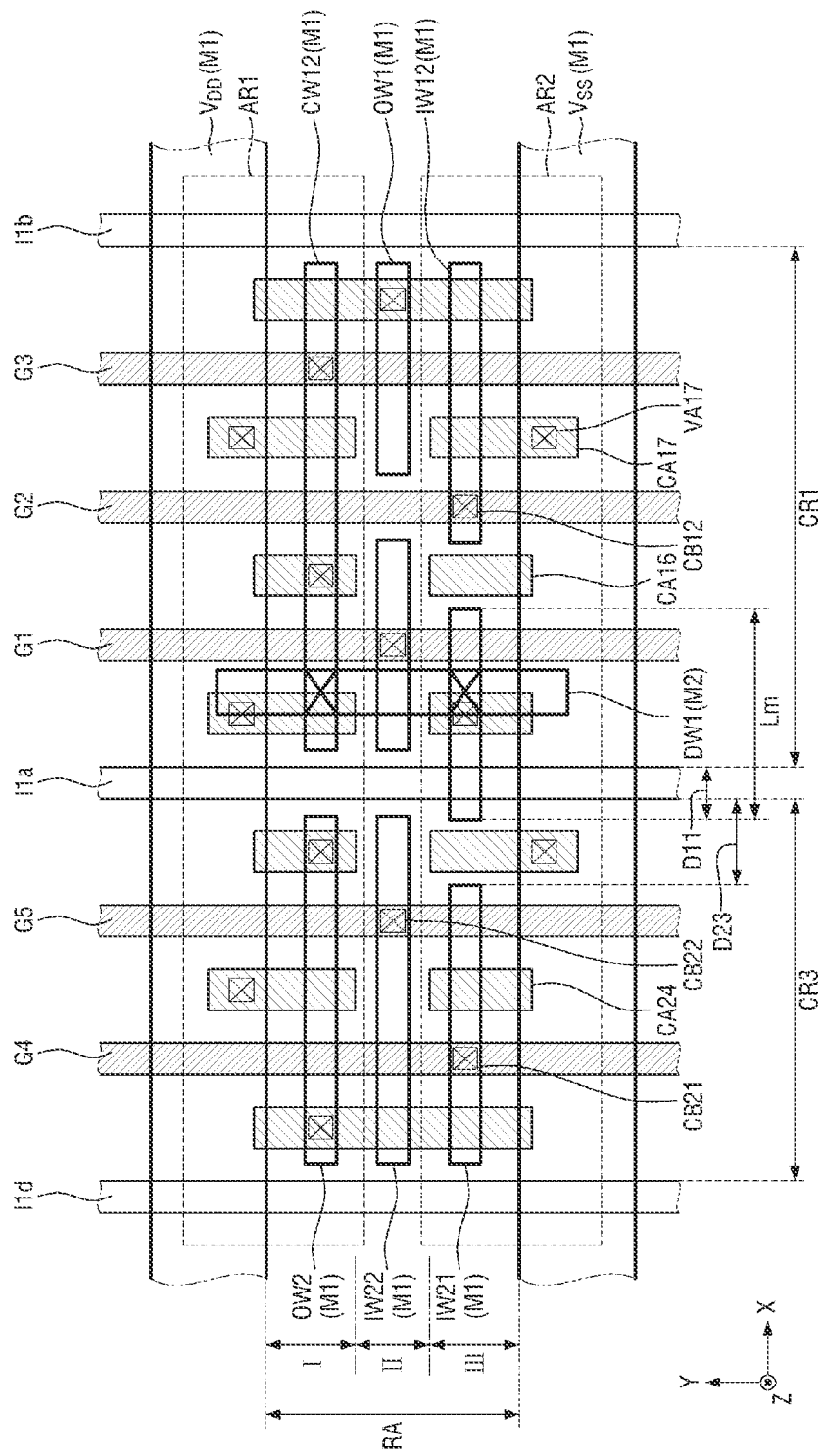

FIGS. 14 and 15 are layout diagrams for showing a semiconductor device according to some embodiments. For convenience of explanation, repeated parts of contents explained above using FIGS. 1 to 5 will be briefly explained or omitted. Referring to FIGS. 14 and 15, the semiconductor device according to some embodiments further includes a third cell region CR3.

A standard cell provided by the cell library may be provided inside the third cell region CR3. In FIGS. 14 and 15, the standard cell provided in the third cell region CR3 is a 2-input NAND (NAND2) cell. As an example, the semiconductor devices provided in the third cell region CR3 may include fourth and fifth gate electrodes G4 and G5, source/drain contacts CA21 to CA25, first contact vias VA21 to VA25, gate contacts CB21 and CB22, and first routing wiring IW21, IW22, and OW2. Since the connection between the fourth and fifth gate electrodes G4 and G5, the source/drain contacts CA21 to CA25, the first contact vias VA21 to VA25, the gate contacts CB21 and CB22, and the first routing wirings IW21, IW22, and OW2 is similar to that explained above using FIG. 1, detailed description thereof will not be provided below.

The first cell region CR1 and the third cell region CR3 may be arranged along the first direction X. The third cell region CR3 may be adjacent to the first cell region CR1. In some embodiments, the third cell region CR3 may be defined by a first cell separation pattern I1a and a fourth cell separation pattern I1d arranged along the first direction X.

A sixth wiring pattern IW21 may function as a third input wiring that provides a third input signal to the third cell region CR3. A seventh wiring pattern IW22 may function as a fourth input wiring that provides a fourth input signal to the third cell region CR3. An eighth wiring pattern OW2 may function as a second output wiring that provides a second output signal from the third cell region CR3.

In some embodiments, at least some of the first routing wirings IW21, IW22, and OW2 of the third cell region CR3 may retract from the boundary of the third cell region CR3. FIGS. 14 and 15 show, as an example, that the sixth wiring pattern IW21 retracts from the boundary of the third cell region CR3.

The first routing wirings IW21, IW22, and OW2 of the third cell region CR3 may provide a space for the first routing wirings IW11, IW12, CW11, CW12, and OW1 of the first cell region CR1. For example, the sixth wiring pattern IW21 retracting from the boundary of the third cell region CR3 may provide a space for the third wiring pattern CW11 protruding from the boundary of the first cell region CR1. More specifically, the third wiring pattern CW11 may extend in the first direction X over the first cell region CR1 and the third cell region CR3. Accordingly, it is possible to provide a semiconductor device capable of securing efficient PnR resources.

A length D23 of the sixth wiring pattern IW21 retracting from the boundary of the third cell region CR3 may vary, depending on the placement of the sixth wiring pattern IW21. As an example, the length D23 of the sixth wiring pattern IW21 retracting from the boundary of the third cell region CR3 may be 0.5 gate pitch GP or more. Alternatively, as an example, the length D23 of the sixth wiring pattern IW21 retracting from the boundary of the third cell region CR3 may be one gate pitch GP or more, or 1.5 gate pitches GP or more.

Figure 16:
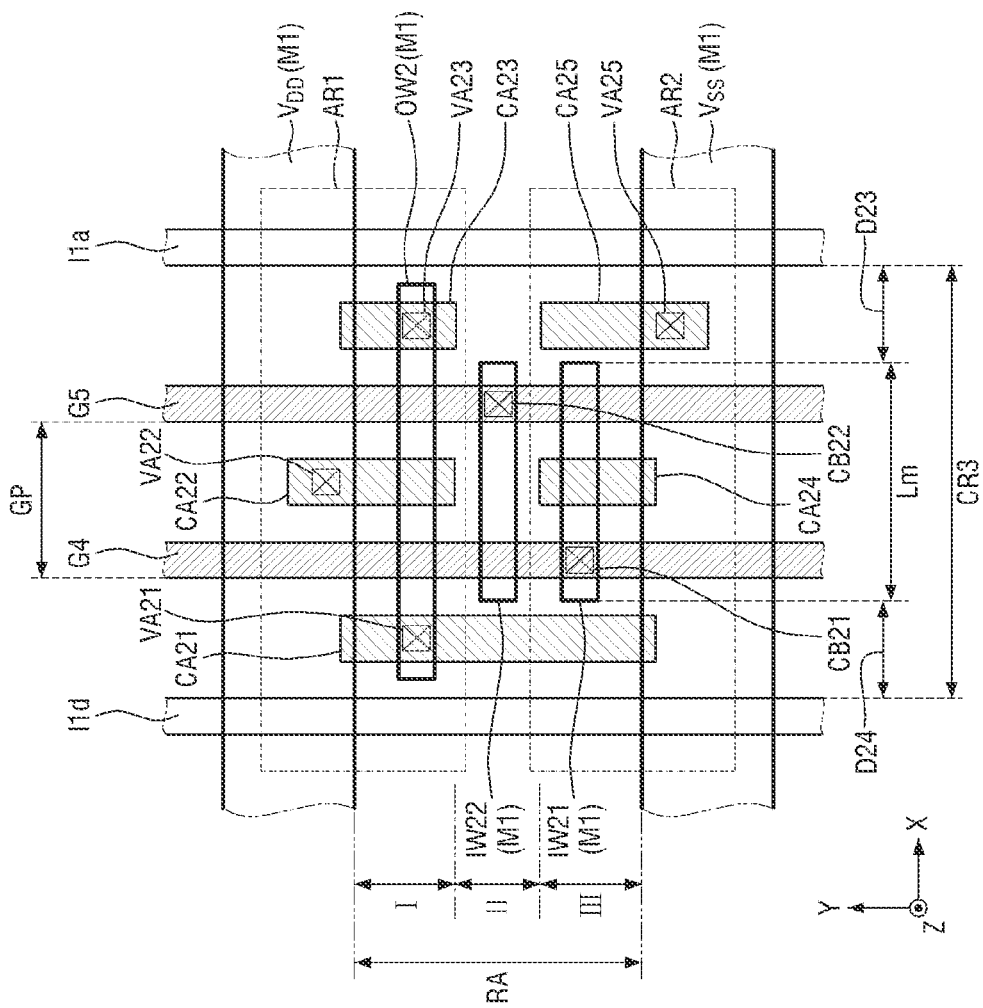
FIGS. 16 and 17 are various layout diagrams for showing a semiconductor device according to some embodiments.
Figure 17:
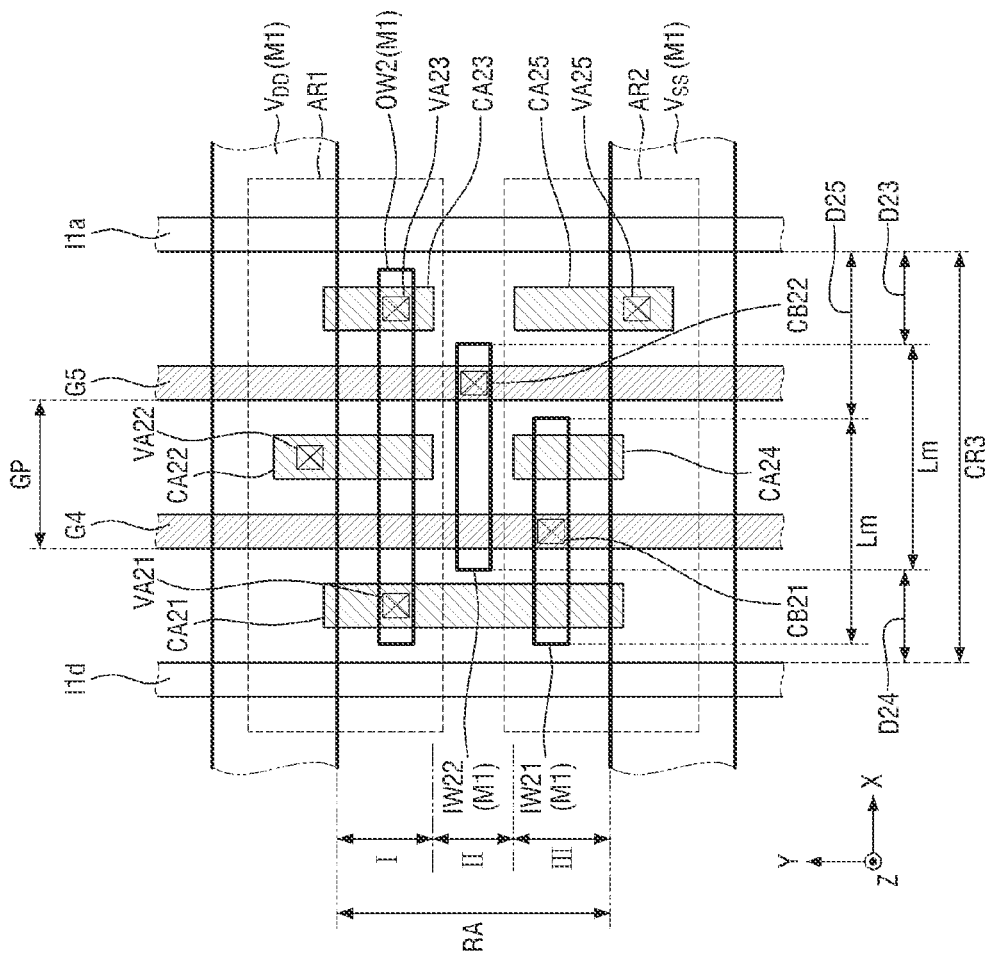

FIGS. 16 and 17 are various layout diagrams for showing a semiconductor device according to some embodiments. For convenience of explanation, repeated parts of contents explained above using FIGS. 1 to 15 will be briefly explained or omitted. Referring to FIG. 16, in the semiconductor device according to some embodiments, at least some of the first routing wirings IW21, IW22, and OW2 of the third cell region CR3 retract from both sides of the boundary of the third cell region CR3.

FIG. 16 schematically shows that the sixth wiring pattern IW21 and the seventh wiring pattern IW22 each retract from both sides of the boundary of the third cell region CR3. Lengths D23 and D24 of the sixth wiring pattern IW21 and the seventh wiring pattern IW22 retracting from both sides of the boundary of the third cell region CR3 may vary, depending on the placement of the sixth wiring pattern IW21 and the seventh the wiring pattern IW22. Accordingly, it is possible to provide a semiconductor device capable of securing more efficient PnR resources.

In some embodiments, the sixth wiring pattern IW21 and the seventh wiring pattern IW22 may each be close to the minimum wiring length according to the defined design rules. As an example, a length Lm of the sixth wiring pattern IW21 and the seventh wiring pattern IW22 extending in the first direction X may each be 2 gate pitches GP or less.

Referring to FIG. 17, in the semiconductor device according to some embodiments, the sixth wiring pattern IW21 and the seventh wiring pattern IW22 are arranged to intersect (e.g., in a zigzag pattern) in the second direction Y.

As an example, the sixth wiring pattern IW21 may retract by D25 from one side of the boundary of the third cell region CR3. The seventh wiring pattern IW22 may be spaced apart by D23 from one side of the boundary of the third cell region CR3, and may be spaced apart by D24 from the other side of the boundary of the third cell region CR3. In such a case, it is easy to provide PnR resources for high level wiring (for example, a routing wiring placed at the second routing level M2), and a semiconductor device capable of securing more efficient PnR resources may be provided.

Figure 18:
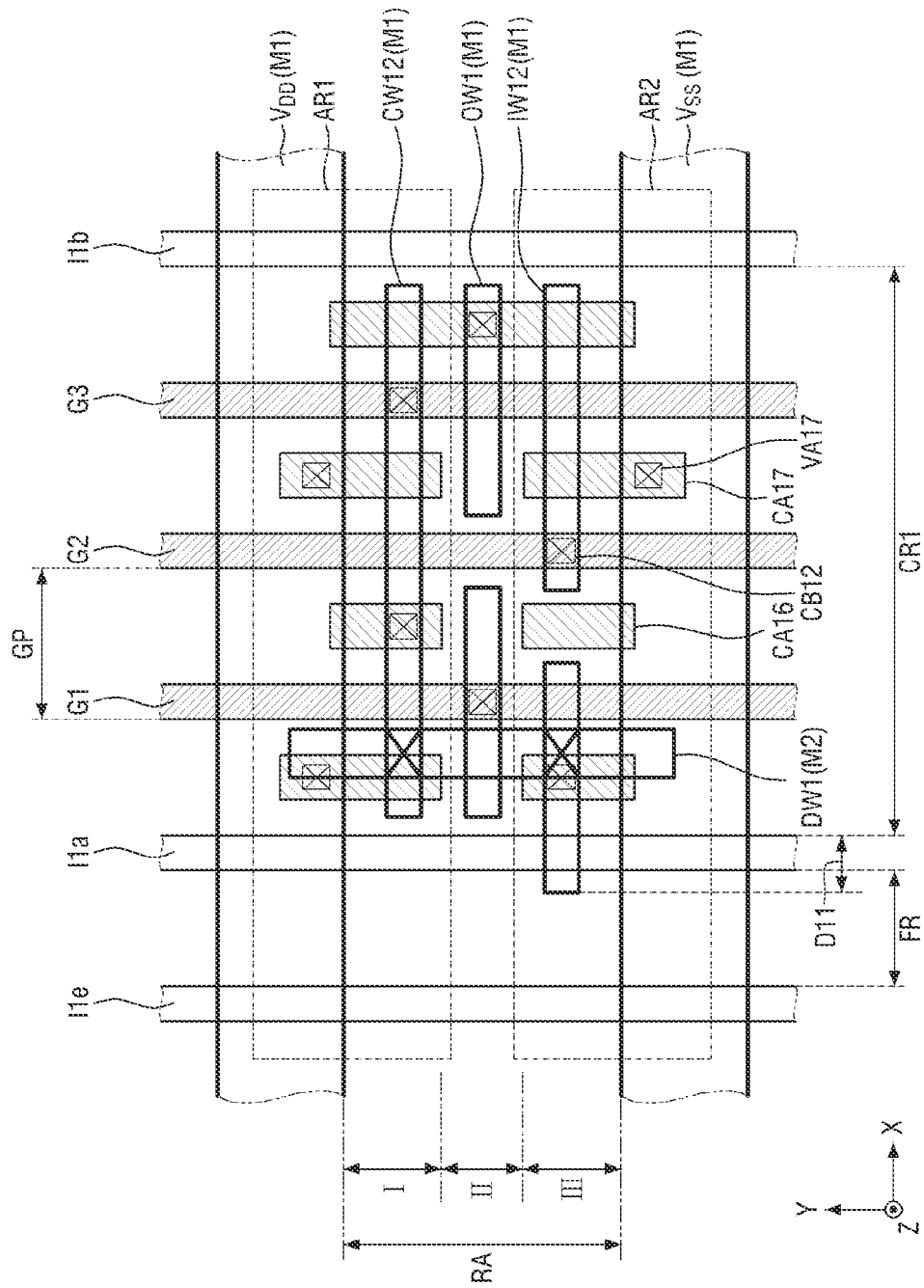
FIG. 18 is a layout diagram for explaining a semiconductor device according to some embodiments.

FIG. 18 is a layout diagram for explaining a semiconductor device according to some embodiments. For convenience of explanation, repeated parts of contents explained above using FIGS. 1 to 17 will be briefly described or omitted. Referring to FIG. 18, the semiconductor device according to some embodiments further includes a filler cell region FR.

The first cell region CR1 and the filler cell region FR may be arranged along the first direction X. The filler cell region FR may be adjacent to the first cell region CR1. In some embodiments, the filler cell region FR may be defined by a first cell separation pattern I1a and a fifth cell separation pattern I1e arranged along the first direction X.

A filler cell (or a dummy cell), which fills an empty space between the cell regions in which a standard cell is provided, may be provided inside the filler cell region FR. As an example, source/drain contacts or gate electrodes may not be placed between the first cell separation pattern I1a and the fifth cell separation pattern I1e.

The filler cell region FR may provide a space for the first routing wirings IW11, IW12, CW11, CW12, and OW1 of the first cell region CR1. For example, the filler cell region FR may provide a space for a third wiring pattern CW11 that protrudes from the boundary of the first cell region CR1. More specifically, the third wiring pattern CW11 may extend in the first direction X over the first cell region CR1 and the filler cell region FR. Accordingly, it is possible to provide a semiconductor device capable of securing efficient PnR resources.

Figure 19:
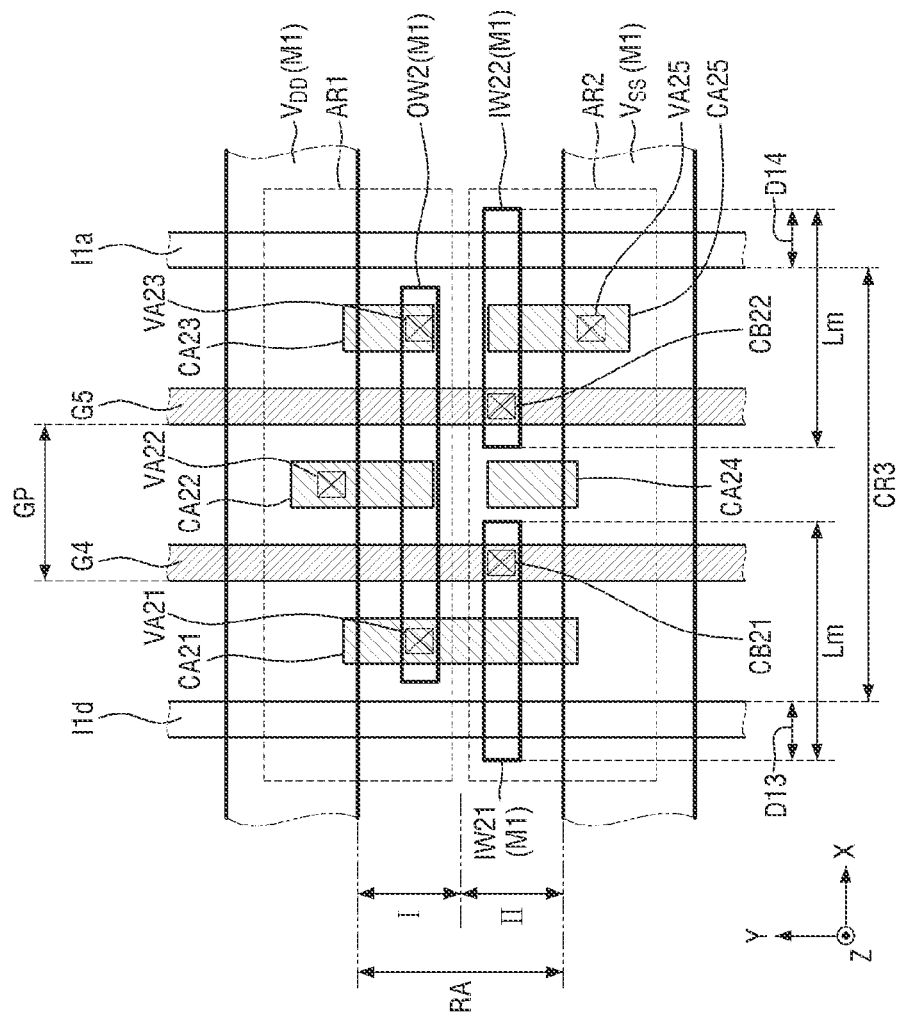
FIGS. 19 to 21 are various layout diagrams for showing a semiconductor device according to some embodiments.
Figure 20:
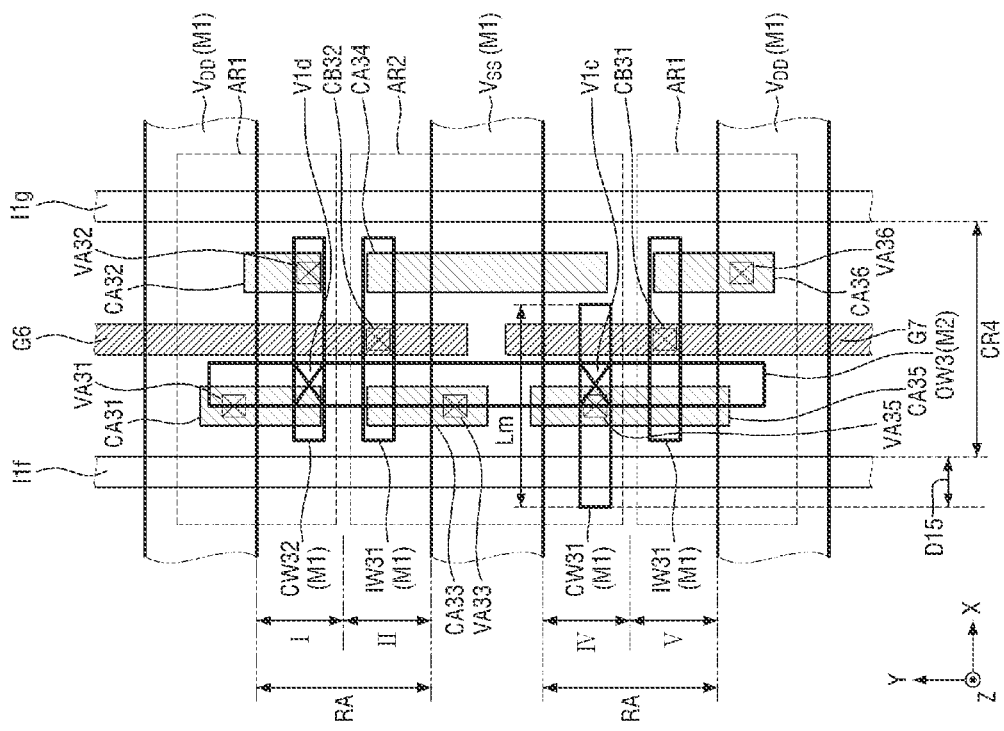
Figure 21:
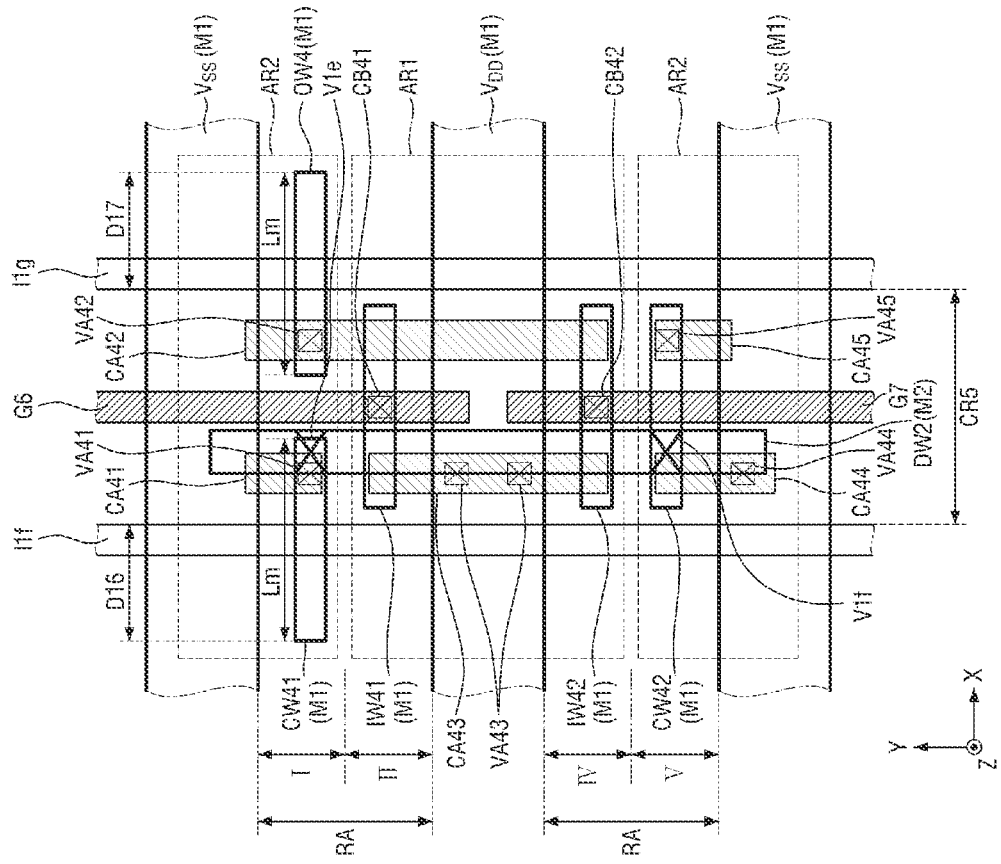

FIGS. 19 to 21 are various layout diagrams for showing a semiconductor device according to some embodiments. For convenience of explanation, repeated parts of contents explained above using FIGS. 1 to 17 will be briefly described or omitted. Referring to FIG. 19, in the semiconductor device according to some embodiments, the routing region RA of the third cell region CR3 may include two or less routing tracks.

As an example, the routing region RA may include first and second routing tracks I and II that are sequentially arranged along the second direction Y. The first routing wirings IW21, IW22, and OW2 of the third cell region CR3 may each be placed on one of the first and second routing tracks I and II.

As an example, the sixth wiring pattern IW21 may be placed in the second routing track II and connected to the fourth gate electrode G4. The seventh wiring pattern IW22 may be placed in the second routing track I and connected to the fifth gate electrode G5.

In some embodiments, at least some of the first routing wirings IW21, IW22, and OW2 of the third cell region CR3 may protrude from the boundary of the third cell region CR3. FIG. 19 schematically shows that the sixth wiring pattern IW21 and the seventh wiring pattern IW22 each protrude from the boundary of the third cell region CR3. Specifically, the seventh wiring pattern IW22 may protrude from one side of the third cell region CR3, and the sixth wiring pattern IW21 may protrude from the other side of the third cell region CR3.

The lengths D13 and D14 of each of the sixth wiring pattern IW21 and the seventh wiring pattern IW22 protruding from the boundary of the third cell region CR3 may vary, depending on the placement of the sixth wiring pattern IW21 and the seventh wiring pattern IW22. As an example, the lengths D13 and D14 of each of the sixth wiring pattern IW21 and the seventh wiring pattern IW22 protruding from the boundary of the third cell region CR3 may be 0.5 gate pitch GP or less.

Referring to FIG. 20, the semiconductor device according to some embodiments includes a fourth cell region CR4. The standard cell provided by the cell library may be provided inside the fourth cell region CR4. In FIG. 20, the standard cell provided in the fourth cell region CR4 is a 2-input NAND (NAND2) cell, which may be configured from four (4) transistors (2 NMOS, 2 PMOS). As an example, the semiconductor devices provided in the fourth cell region CR4 may include first to third active regions AR1 to AR3, sixth and seventh gate electrodes G6 and G7, source/drain contacts CA31 to CA36, first contact vias VA31 to VA36, gate contacts CB31 and CB32, first and second power supply wirings $V_{DD}$ and $V_{SS}$, first routing wirings IW31, IW32, CW31, and CW32, and a second routing wiring OW3. Since the connection between the first to third active regions AR1 to AR3, the sixth and seventh gate electrodes G6 and G7, the source/drain contacts CA31 to CA36, the first contact vias VA31 to VA36, the gate contacts CB31 and CB32, the first and second power supply wirings $V_{DD}$ and $V_{SS}$, the first routing wirings IW31, IW32, CW31, and CW32, and the second routing wiring OW3 is similar to that explained above using FIG. 1, detailed description thereof will not be provided below.

In some embodiments, the fourth cell region CR4 may be defined by a sixth cell separation pattern I1f and a seventh cell separation pattern I1g arranged along the first direction X.

In some embodiments, a multi-row (height) standard cell may be provided inside the fourth cell region CR4. As an example, the second power supply wiring $V_{SS}$ in the fourth cell region CR4 may be interposed between the two first power supply wirings $V_{DD}$. The routing region RA may include, for example, first and second routing tracks I and II defined between one first power supply wiring $V_{DD}$ and the second power supply wiring $V_{SS}$, and fourth and fifth routing tracks IV and V defined between the other first power supply wiring $V_{DD}$ and the second power supply wiring $V_{SS}$. Each of the first routing wirings IW31, IW32, CW31, and CW32 of the fourth cell region CR4 may be placed in one of the first, second, fourth and fifth routing tracks I, II, IV, and V.

A ninth wiring pattern IW31 may function as a third input wiring that provides the third input signal to the fourth cell region CR4. A tenth wiring pattern IW32 may function as a fourth input wiring that provides the fourth input signal to the fourth cell region CR4. Eleventh and twelfth wiring patterns CW31 and CW32 may each function as connection wirings that connect signals in the fourth cell region CR4. The second routing wiring OW3 may function as a second output wiring that provides the second output signal from the fourth cell region CR4.

In some embodiments, at least some of the first routing wirings IW31, IW32, CW31, and CW32 of the fourth cell region CR4 may protrude from the boundary of the fourth cell region CR4. FIG. 20 schematically shows that the eleventh wiring pattern CW31 protrudes from the boundary of the fourth cell region CR4. A length D15 of the eleventh wiring pattern CW31 protruding from the boundary of the fourth cell region CR4 may vary, depending on the placement of the eleventh wiring pattern CW31. As an example, the length D15 of the eleventh wiring pattern CW31 protruding from the boundary of the fourth cell region CR4 may be 0.5 gate pitch GP or less.

In some embodiments, the eleventh routing pattern CW31 protruding from the boundary of the fourth cell region CR4 may be close to the minimum wiring length according to the defined design rules. As an example, the length Lm of the eleventh wiring pattern CW31 extending in the first direction X may be 2 gate pitches GP or less.

Referring to FIG. 21, the semiconductor device according to some embodiments includes a fifth cell region CR5. The standard cell provided by the cell library may be provided inside the fifth cell region CR5. In FIG. 21, the standard cell provided in the fifth cell region CR5 is a 2-input NAND (NAND2) cell. As an example, the semiconductor device provided in the fifth cell region CR5 may include the first to third active regions AR1 to AR3, the sixth and seventh gate electrodes G6 and G7, the source/drain contacts CA41 to CA45, the first contact vias VA41 to VA45, the gate contacts CB41 and CB42, the first and second power supply wirings $V_{DD}$ and $V_{SS}$, the first routing wirings IW41, IW42, CW41, CW42, and OW4, and the second routing wiring DW2. Since the connection between the first to third active regions AR1 to AR3, the sixth and seventh gate electrodes G6 and G7, the source/drain contacts CA41 to CA45, the first contact vias VA41 to VA45, the gate contacts CB41 to CB42, the first and second power supply wirings $V_{DD}$ and $V_{SS}$, the first routing wirings IW41, IW42, CW41, CW42 and OW4, and the second routing wiring DW2 is similar to that explained above using FIG. 1, detailed description thereof will not be provided below.

In some embodiments, the fifth cell region CR5 may be defined by a sixth cell separation pattern I1f and a seventh cell separation pattern I1g arranged along the first direction X. In some embodiments, a multi-column standard cell may be provided inside the fifth cell region CR5. As an example, the first power supply wiring $V_{DD}$ in the fifth cell region CR5 may be interposed between the two second power supply wirings $V_{SS}$. The routing region RA may include, for example, first and second routing tracks I and II defined between one second power supply wiring $V_{SS}$ and the first power supply wiring $V_{DD}$, and fourth and fifth routing tracks IV and V defined between the other second power supply wiring $V_{SS}$ and the first power supply wiring $V_{DD}$. Each of the first routing wirings IW41, IW42, CW41, CW42, and OW4 of the fifth cell region CR5 may be placed in one of the first, second, fourth and fifth routing tracks I, II, IV, and V.

A thirteenth wiring pattern IW41 may function as a third input wiring that provides the third input signal to the fifth cell region CR5. A fourteenth wiring pattern IW42 may function as a fourth input wiring that provides the fourth input signal to the fifth cell region CR5. Each of fifteenth and sixteenth wiring patterns CW41 and CW42 may function as connection wirings that connect signals in the fifth cell region CR5. A seventeenth wiring pattern OW4 may function as a second output wiring that provides the second output signal to the fifth cell region CR5.

In some embodiments, at least some of the first routing wirings IW31, IW32, CW31, and CW32 of the fifth cell region CR5 may protrude from the boundary of the fifth cell region CR5. FIG. 21 shows an example in which the fifteenth wiring pattern CW41 and the seventeenth wiring pattern OW4 protrude from the boundary of the fifth cell region CR5. Lengths D16 and D17 of each of the fifteenth wiring pattern CW41 and the seventeenth wiring pattern OW4 protruding from the boundary of the fifth cell region CR5 may vary, depending on the placement of the fifteenth wiring pattern CW41 and the seventeenth wiring pattern OW4. As an example, the lengths D16 and D17 of each of the fifteenth wiring pattern CW41 and the seventeenth wiring pattern OW4 protruding from the boundary of the fifth cell region CR5 may be one gate pitch GP or less.

In some embodiments, the fifteenth wiring pattern CW41 and the seventeenth wiring pattern OW4 protruding from the boundary of the fifth cell region CR5 may be close to the minimum wiring length according to the defined design rule. As an example, a length Lm of each of the fifteenth wiring pattern CW41 and the seventeenth wiring pattern OW4 extending in the first direction X may be 2 gate pitches GP or less.

Figure 22:
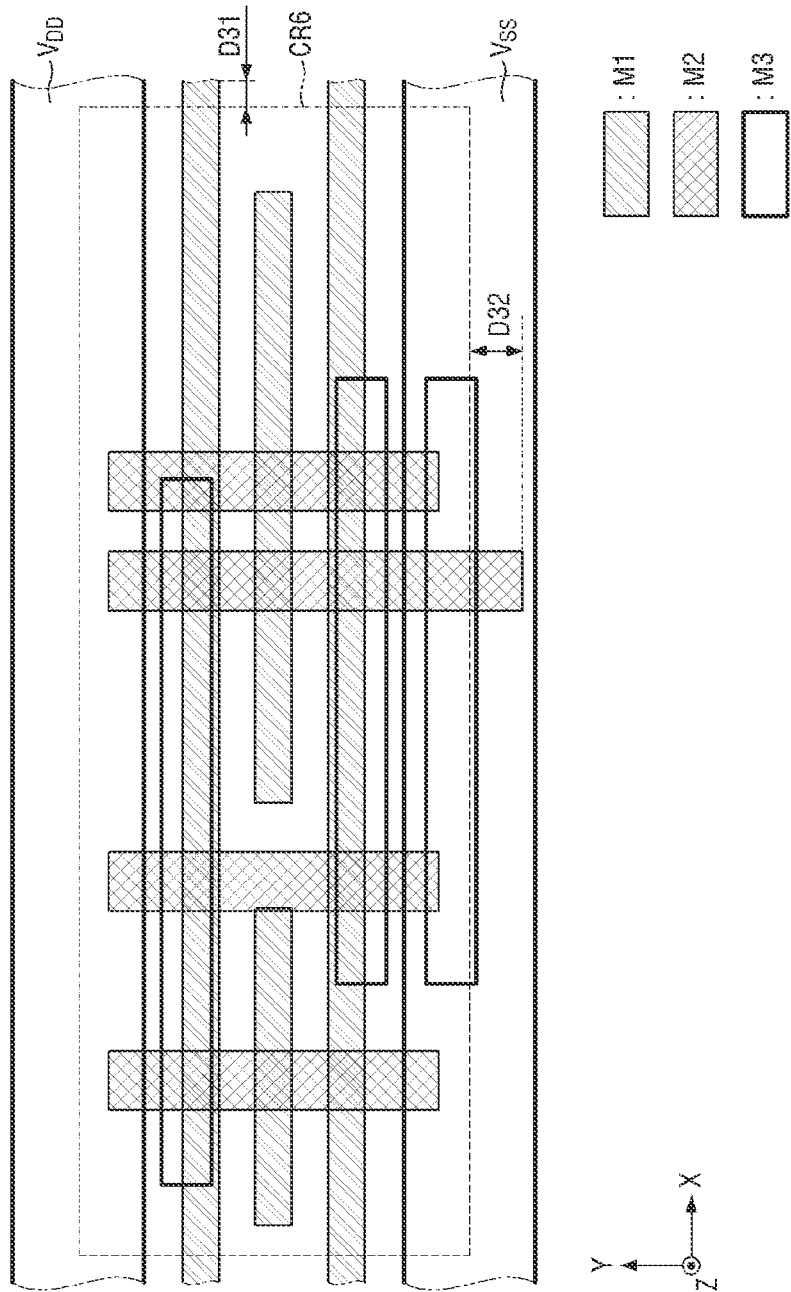
FIGS. 22 and 23 are various layout diagrams for explaining a semiconductor device according to some embodiments.
Figure 23:
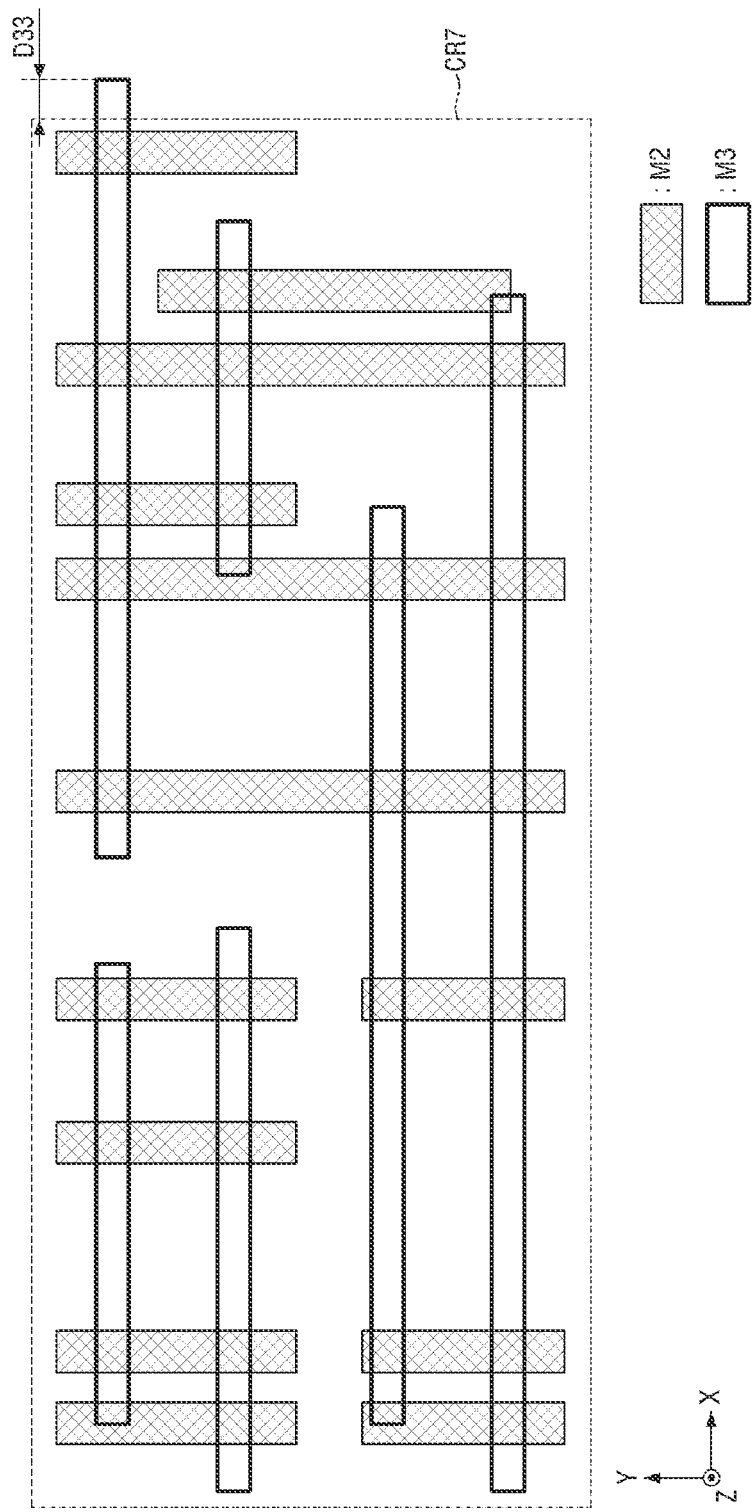

FIGS. 22 and 23 are various layout diagrams for explaining a semiconductor device according to some embodiments. For convenience of explanation, repeated parts of contents explained above using FIGS. 1 to 21 will be briefly described or omitted. Referring to FIG. 22, the semiconductor device according to some embodiments includes a sixth cell region CR6.

The standard cell provided by the cell library may be provided inside the sixth cell region CR6. Routing wirings of various routing levels may be provided inside the sixth cell region CR6. As an example, the semiconductor device provided in the sixth cell region CR6 may include first routing wirings placed at the first routing level M1, second routing wirings placed at the second routing level M2 higher than the first routing level M1, and third routing wirings placed at a third routing level M3 higher than the second routing level M2.

In some embodiments, at least some of various routing wirings provided inside the sixth cell region CR6 may protrude from the boundary of the sixth cell region CR6. FIG. 22 shows an example in which a part of the first routing wirings of the first routing level M1 and a part of the second routing wirings of the second routing level M2 protrude from the boundary of the sixth cell region CR6. Specifically, a part of the first routing wirings of the first routing level M1 extends in the first direction X, and may protrude from the boundary of the sixth cell region CR6 extending in the second direction Y. A part of the second routing wirings of the second routing level M2 extends in the second direction Y, and may protrude from the boundary of the sixth cell region CR6 extending in the first direction X.

A length D31 of the first routing wiring of the first routing level M1 protruding from the sixth cell region CR6 may vary, depending on the placement of the sixth cell region CR6 or the first routing wiring of the cell region adjacent to the sixth cell region CR6. As an example, the length D31 of the first routing wiring of the first routing level M1 protruding from the sixth cell region CR6 may be 0.5 gate pitch GP or less, one gate pitch GP or less, or 1.5 gate pitches GP or less. Similarly, a length D32 of the second routing wiring of the second routing level M2 protruding from the sixth cell region CR6 may also vary, depending on the placement of the sixth cell region CR6 or the second routing wiring adjacent to the sixth cell region CR6.

Referring to FIG. 23, the semiconductor device according to some embodiments includes a seventh cell region CR7. A standard cell provided by the cell library may be provided inside the seventh cell region CR7. Routing wirings of various routing levels may be provided inside the seventh cell region CR7. As an example, the semiconductor device provided in the seventh cell region CR7 may include second routing wirings placed at the second routing level M2, and third routing wirings placed at the third routing level M3 higher than the second routing level M2.

In some embodiments, at least some of the various routing wirings provided inside the seventh cell region CR7 may protrude from the boundary of the seventh cell region CR7. FIG. 23 shows an example in which a part of the third routing wirings of the third routing level M3 protrudes from the boundary of the seventh cell region CR7. Specifically, a part of the third routing wirings of the third routing level M3 extends in the first direction X, and may protrude from the boundary of the seventh cell region CR7 extending in the second direction Y.

A length D33 of the third routing wiring of the third routing level M3 protruding from the seventh cell region CR7 may vary, depending on the placement of the seventh cell region CR7 or the first routing wiring adjacent to the seventh cell region CR7.

Hereinafter, the layout design method and the method for fabricating the semiconductor device according to some embodiments will be described referring to FIGS. 24 to 30B.

Figure 24:
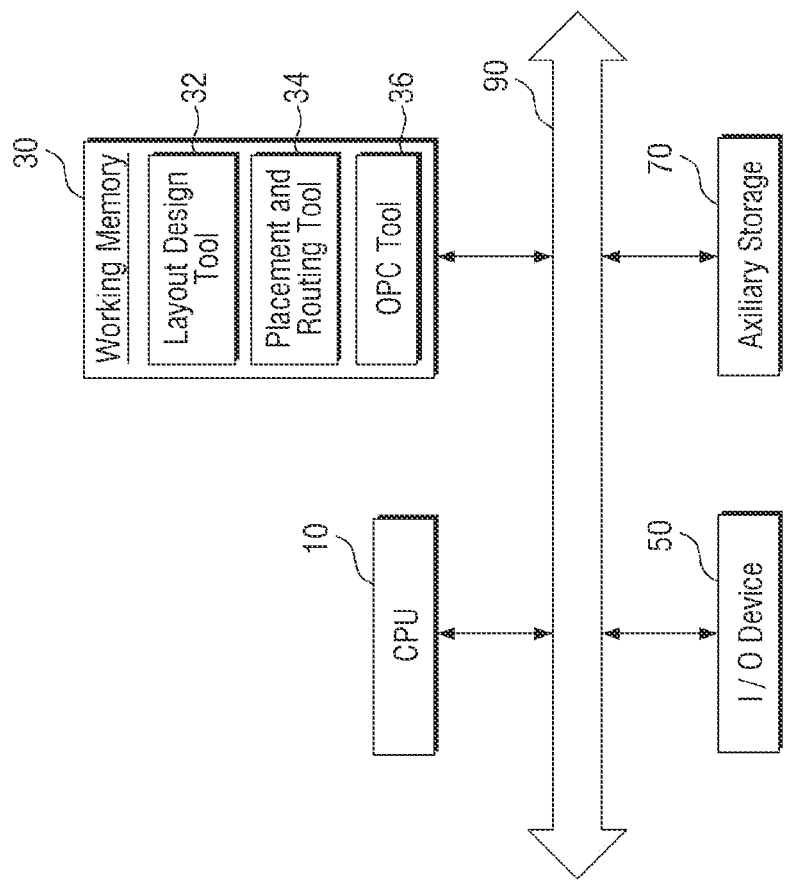
FIG. 24 is a block diagram of a computer system for performing the layout design of the semiconductor device according to some embodiments.

FIG. 24 is a block diagram of a computer system for performing the layout design of the semiconductor device according to some embodiments. Referring to FIG. 24, the computer system may include a CPU 10, a working memory 30, an I/O device 50, an auxiliary storage device 70, and a system interconnector 90. Here, the computer system may be provided as a dedicated device for a layout design of the semiconductor device according to some embodiments. In some embodiments, the computer system may also include various design and verification simulation programs.

The CPU 10 may execute software (application programs, operating systems, and device drivers) that runs on the computer system. The CPU 10 may execute the operating system loaded into the working memory 30. The CPU 10 may execute various applications to be driven on the basis of the operating system. For example, the CPU 10 may execute a layout design tool 32, a placement and routing tool 34 and/or an OPC tool 36 loaded into the working memory 30.

The operating system or the application programs may be loaded into the working memory 30. An operating system image (not shown) stored in the auxiliary storage device 70 may be loaded into the working memory 30 on the basis of the booting sequence, when booting up the computer system. The operating system may support various I/O operations of the computer system.

A layout design tool 32 for the layout design of the semiconductor device according to some embodiments may be loaded from the auxiliary storage device 70 into the working memory 30. Subsequently, the placement and routing tool 34, which places the designed standard cells, rearranges the internal wiring pattern in the placed standard cell, and routes the placed standard cells, may be loaded from the auxiliary storage device 70 into the working memory 30. Subsequently, an OPC tool 36 that performs optical proximity correction (OPC) of the designed layout data may be loaded from the auxiliary storage device 70 into the working memory 30.

The I/O device 50 may control the user input and output from the user interface devices. For example, the I/O device 50 includes a keyboard and a monitor, and may receive input of information from the user. The user may receive input of information about semiconductor regions and data paths that require adjusted operating characteristics, using the I/O device 50. Also, the processing procedure and the processing results of the OPC tool 36 may be displayed through the I/O device 50.

The auxiliary storage device 70 may be provided as a storage medium of the computer system. The auxiliary storage device 70 may store application programs, an operating system image, and various data.

The system interconnector 90 may be a system bus for providing a network inside the computer system. The CPU 10, the working memory 30, the I/O device 50, and the auxiliary storage device 70 may be electrically connected and data may be exchanged through the system interconnector 90.

Figure 25:
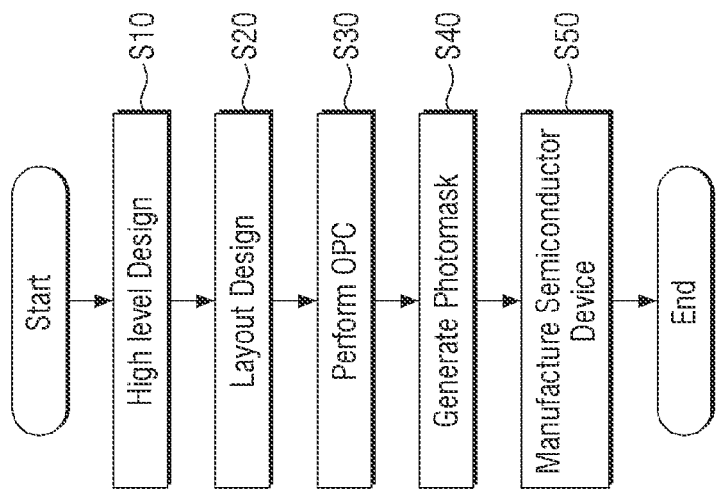
FIG. 25 is a flowchart for explaining a layout design method and a method for fabricating the semiconductor device according to some embodiments.

FIG. 25 is a flowchart for explaining a layout design method and a method for fabricating the semiconductor device according to some embodiments. Referring to FIG. 25, a high level design of the semiconductor integrated circuit may be performed, using the computer system explained above using FIG. 22 (S10). The high level design may mean description of the integrated circuit to be designed in the parent language of the computer language. For example, a parent language such as C language may be used for the high level design. Circuits designed by high level design may be expressed more specifically by register transfer level (RTL) coding and simulation. Subsequently, the code generated by the register transfer level coding is converted into a netlist and may be synthesized by the entire semiconductor elements. A synthesized schematic circuit is verified by the simulation tool, and the adjustment process may be accompanied according to the verification result.

Subsequently, a layout design for implementing the logically completed semiconductor integrated circuit on a silicon substrate may be performed (S20). For example, the layout design may be performed by referring to the schematic circuit synthesized by the high level design or the netlist corresponding thereto. The layout design may include a routing procedure of placing and connecting various standard cells provided by the cell library according to the defined design rules.

The layout may be a procedure of defining the shape or size of a pattern for forming a transistor and metal wirings to be actually formed on a silicon substrate. For example, in order to actually form the inverter circuit on the silicon substrate, layout patterns such as PFET, NFET, P-WELL, N-WELL, the gate electrode, and the wiring patterns placed on them may be appropriately placed.

Next, routing on the selected and placed standard cells may be performed. Specifically, the upper wirings (routing patterns) may be placed on the placed standard cell. By performing the routing, the placed standard cells may be interconnected in accordance with the design. After routing, the layout may be verified whether there are any parts that violate the design rules. Items to be verified may include a DRC (Design Rule Check), an ERC (Electronical Rule Check), a LVS (Layout vs Schematic comparison tool) and the like.

Subsequently, an optical proximity correction (OPC) procedure may be performed (S30). The layout patterns provided through the layout design may be implemented on a silicon substrate, using a photolithography process. At this time, the optical proximity correction may be a technique for correcting a distortion phenomenon that may occur in the photolithography process.

Subsequently, a photomask may be produced on the basis of the layout changed by the optical proximity correction (S40). The photomask may be produced, for example, in a manner of drawing layout patterns, using a chrome film coated on a glass substrate. Subsequently, a semiconductor element may be fabricated, using the generated photomask (S50). In the process of fabricating the semiconductor element using a photomask, various types of exposure and etching processes may be repeated. Through these processes, the shape of the patterns formed at the time of layout design may be sequentially formed on the silicon substrate.

Figure 26:
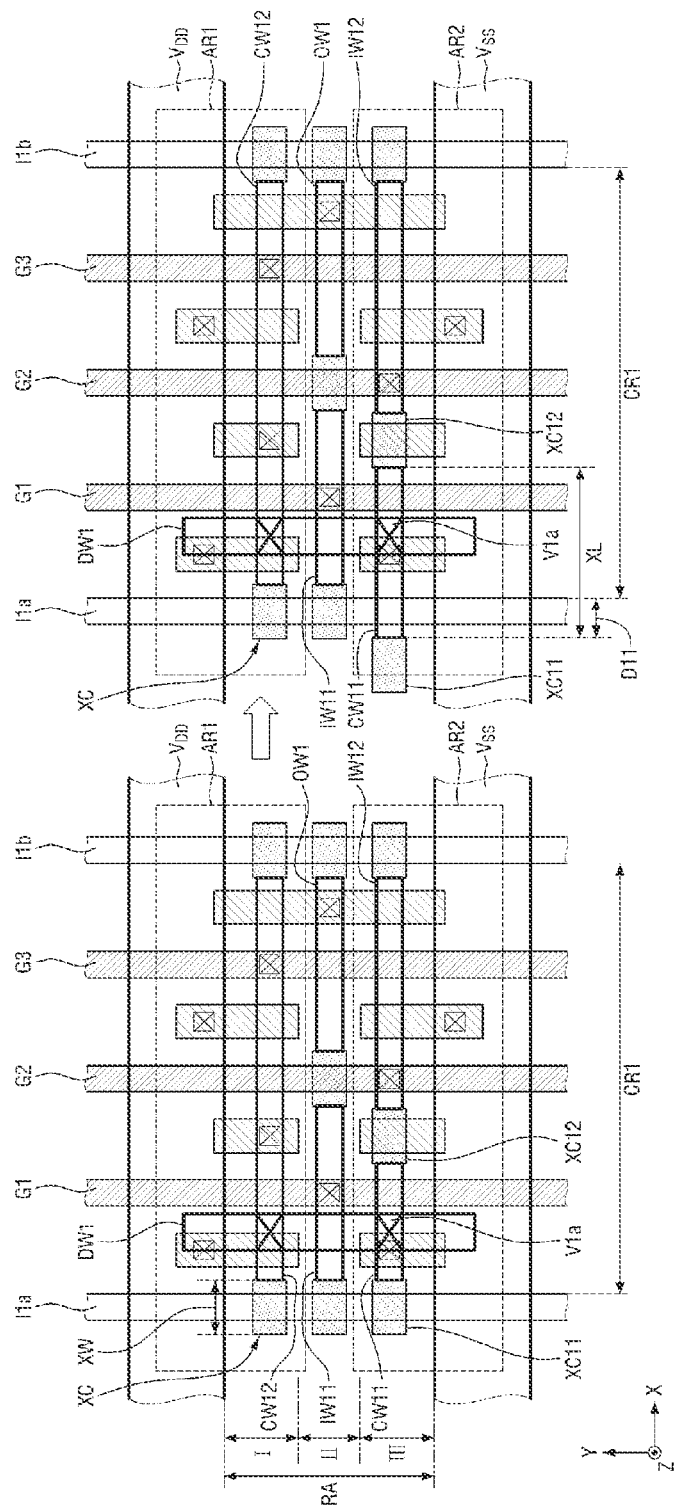
FIGS. 26 to 28 are layout diagrams for explaining the layout design method for the semiconductor device according to some embodiments.
Figure 27:
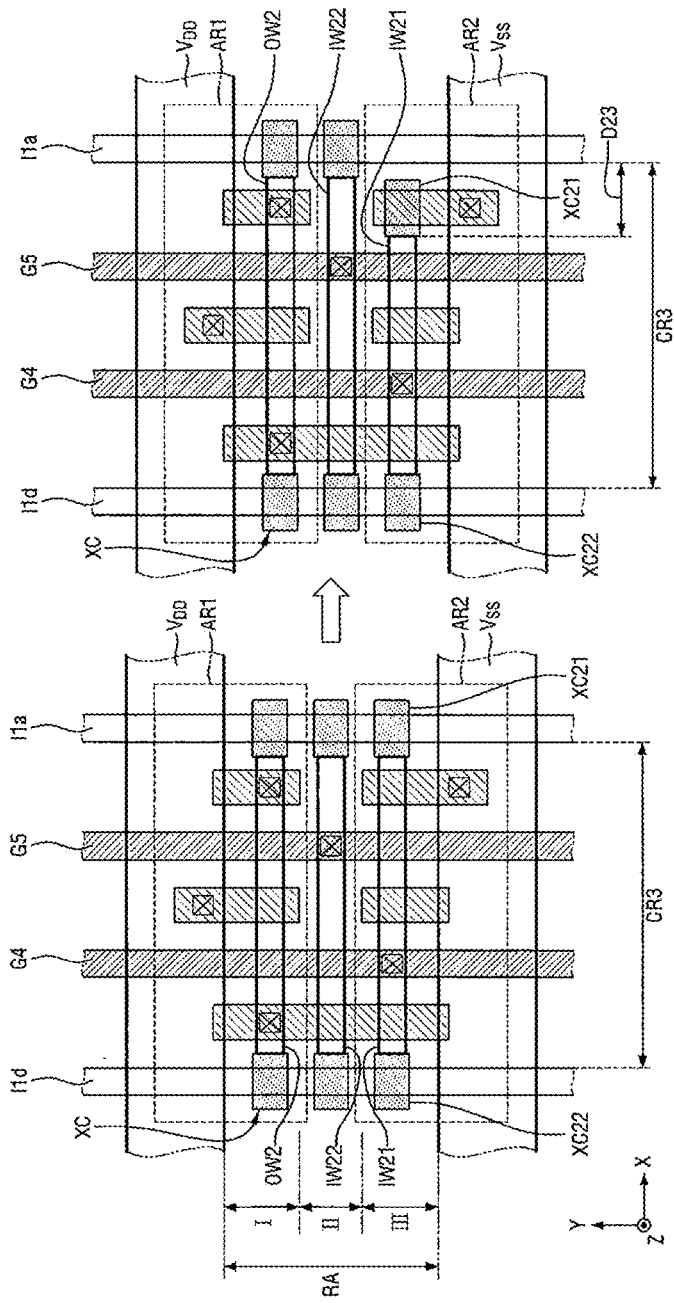
Figure 28:
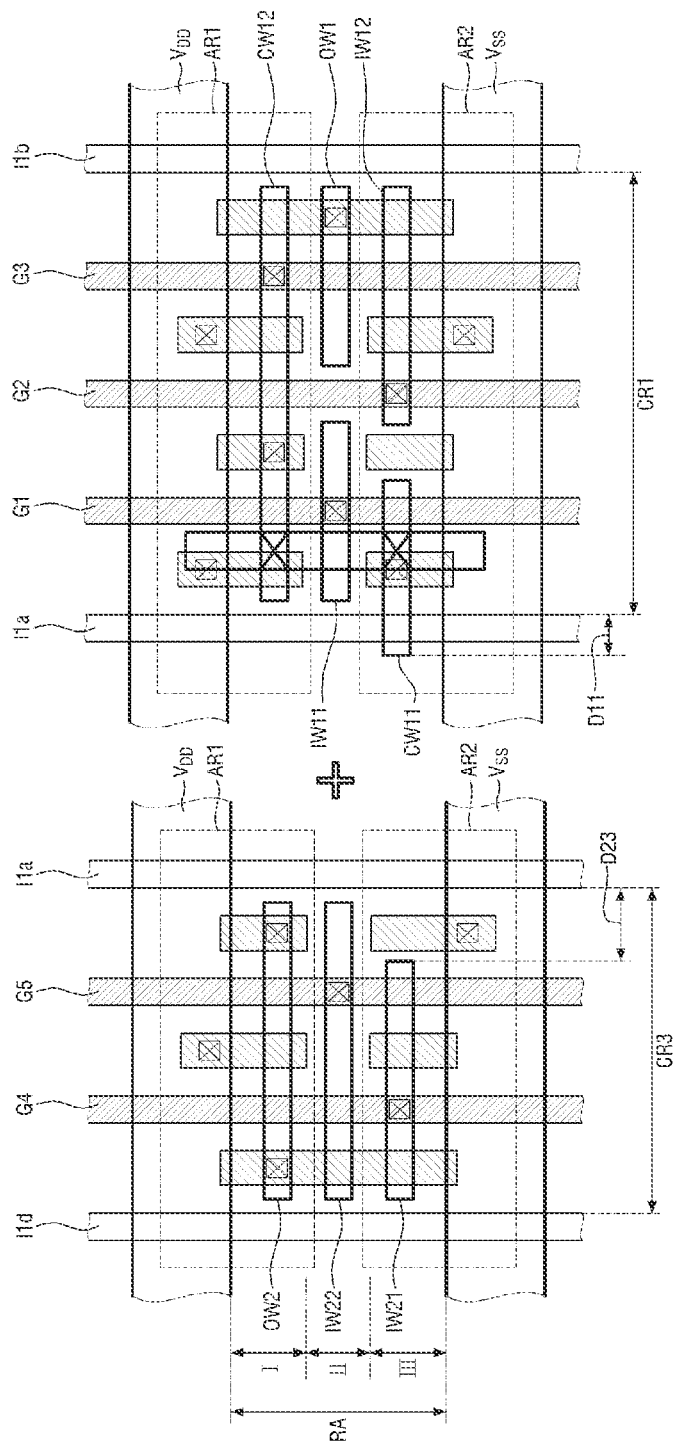

FIGS. 26 to 28 are layout diagrams for explaining the layout design method for the semiconductor device according to some embodiments. For convenience of explanation, repeated parts of contents explained above using FIGS. 1 to 25 will be briefly explained or omitted.

Referring to FIG. 26, a first cell region CR1 is provided. The standard cell provided by the cell library may be provided inside the first cell region CR1. In some embodiments, a relatively complex standard cell may be provided inside the first cell region CR1. For example, the standard cell provided in the first cell region CR1 may be, but is not limited to, a 2-input AND (AND2) cell, a 2-2-input AND-OR-INVERTER (AOI22) cell, a flip-flop (FF) cell, a multiplexer (MUX) cell, or the like. In FIG. 26, the standard cell provided in the first cell region CR1 is a 2-input AND (AND2) cell. As an example, the first cell region CR1 may include first routing wirings IW11, IW12, CW11, CW12, and OW1, and a second routing wiring DW1.

At least some of the first routing wirings IW11, IW12, CW11, CW12, and OW1 may be designed to protrude from the boundary of the first cell region CR1. In some embodiments, among the first routing wirings IW11, IW12, CW11, CW12, and OW1, the wiring pattern protruding from the boundary of the first cell region CR1 may be selected within a predetermined routing track. FIG. 26 schematically shows that the third wiring pattern CW11 in the third routing track III protrudes from the boundary of the first cell region CR1. As an example, when the third wiring pattern CW11 is placed inside the boundary of the first cell region CR1 that implements a relatively complicated 2-input AND (AND2) cell, the third wiring pattern CW11 may be smaller than the minimum wiring length according to the defined design rules. Therefore, the third wiring pattern CW11 may be designed to protrude by D11 from the boundary of the first cell region CR1.

Designing of the third wiring pattern CW11 to protrude from the boundary of the first cell region CR1 may be, but it is not limited to, for example, various operations such as placement of a mask pattern that defines the third wiring pattern CW11 to protrude from the boundary of the first cell region CR1, addition of a mask layer that protects the mask pattern that defines the third wiring pattern CW11, or addition of a mask layer that protrudes from the boundary of the first cell region CR1.

As an example, cutting mask patterns XC may be provided. The cutting mask patterns XC may define the first routing wirings IW11, IW12, CW11, CW12, and OW1. Specifically, routing wirings extending in the first direction X and placed at the first routing level (M1 of FIG. 1) may be provided inside each of the first to third routing tracks I to III. Next, the cutting mask patterns XC that are placed to overlap a part of the routing wirings may be provided. The region of the routing wirings that overlap the cutting mask patterns XC may be cut. Accordingly, the first routing wirings IW11, IW12, CW11, CW12, and OW1 that are spaced apart from each other may be provided.

A spaced distance between the first routing wirings IW11, IW12, CW11, CW12, and OW1 in the first direction X may be determined by a width XW of each cutting mask pattern XC in the first direction X. The width XW of each cutting mask pattern XC may be, but is not limited thereto, for example, 10 nm to 40 nm. As an example, the width XW of each cutting mask pattern XC may be 25 nm to 35 nm.

The cutting mask patterns XC may be provided at the step of performing the layout design (S20 of FIG. 25). For example, the cutting mask patterns XC may be provided in the routing procedure for placing and connecting the standard cells. In some embodiments, the cutting mask patterns XC may be placed so that at least some of the first routing wirings IW11, IW12, CW11, CW12, and OW1 protrude from the boundary of the first cell region CR1. As an example, the cutting mask patterns XC may include a first cutting mask XC11 and a second cutting mask XC12 that define a third wiring pattern CW11. At this time, as shown, the first cutting mask XC11 may be shifted in a direction toward the outside of the first cell region CR1 (for example, −X direction). Therefore, the third wiring pattern CW11 may be designed to protrude from the boundary of the first cell region CR1.

The spaced distance between the cutting mask patterns XC in the first direction X may be close to the minimum wiring length according to the defined design rules. As an example, a spaced distance XL between the first cutting mask XC11 and the second cutting mask XC12 may be 2 gate pitches (GP of FIG. 1) or less. Alternatively, as an example, the spaced distance XL between the first cutting mask XC11 and the second cutting mask XC12 may be 1.5 gate pitches (GP) or less. As an example, the spaced distance XL between the first cutting mask XC11 and the second cutting mask XC12 may be 0.5 gate pitch GP or more and 1.5 gate pitches GP or less.

Referring to FIG. 27, the third cell region CR3 is provided. The standard cell provided by the cell library may be provided inside the third cell region CR3. In some embodiments, a relatively simple standard cell may be provided inside the third cell region CR3. For example, the standard cell provided in the third cell region CR3 may be, but is not limited to, an inverter (INV) cell, a buffer (BUF) cell, a NAND cell, a NOR cell, or the like. In FIG. 27, the standard cell provided in the third cell region CR3 is a 2-input NAND (NAND2) cell. As an example, the third cell region CR3 may include first routing wirings IW21, IW22, and OW2.

At least some of the first routing wirings IW21, IW22, and OW2 may be designed to retract from the boundary of the third cell region CR3. In some embodiments, among the first routing wirings IW21, IW22, and OW2, the routing pattern retracting from the boundary of the third cell region CR3 may be selected within a predetermined routing track. FIG. 27 schematically shows that the sixth wiring pattern IW21 in the third routing track III retracts from the boundary of the third cell region CR3. As an example, the length of the sixth wiring pattern IW21 may be shortened in the third cell region CR3, which implements a relatively simple 2-input NAND (NAND2) cell. Therefore, the sixth wiring pattern IW21 may be designed to retract by D23 from the boundary of the third cell region CR3.

Designing of the sixth wiring pattern IW21 to retract from the boundary of the third cell region CR3 may be, but is not limited to, for example, various operations such as placement of a mask pattern defining the sixth wiring pattern IW21 to retract from the boundary of the third cell region CR3, addition of a mask layer that protects the mask pattern that defines the sixth wiring pattern IW21, or addition of a mask layer that protrudes from the boundary of the third cell region CR3.

As an example, cutting mask patterns XC may be provided. Since the cutting mask patterns XC are similar to those described above in the description of FIG. 26, detailed description thereof will not be provided below.

In some embodiments, the cutting mask patterns XC may be placed such that at least some of the first routing wiring IW21, IW22, and OW2 retract from the boundary of the third cell region CR3. As an example, the cutting mask patterns XC may include a third cutting mask XC21 and a fourth cutting mask XC22 that define a sixth wiring pattern IW21. At this time, as shown, the third cutting mask XC21 may be shifted in a direction toward the inside of the third cell region CR3 (for example, -X direction). Therefore, the sixth wiring pattern IW21 may be designed to retract from the boundary of the third cell region CR3.

Referring to FIG. 28, the first cell region CR1 and the third cell region CR3 are placed to be adjacent to each other. The first cell region CR1 and the third cell region CR3 may be arranged along the first direction X and adjacent to each other. As an example, the first cell separation pattern I1a may separate the first cell region CR1 and the third cell region CR3.

The first routing wirings IW21, IW22, and OW2 of the third cell region CR3 may provide a space for the first routing wirings IW11, IW12, CW11, CW12, and OW1 of the first cell region CR1. For example, the sixth wiring pattern IW21 retracting from the boundary of the third cell region CR3 may provide a space for the third wiring pattern CW11 protruding from the boundary of the first cell region CR1. More specifically, the third wiring pattern CW11 may extend in the first direction X over the first cell region CR1 and the third cell region CR3. Accordingly, it is possible to provide a layout design method for the semiconductor device capable of ensuring efficient PnR resources.

Figure 29A:
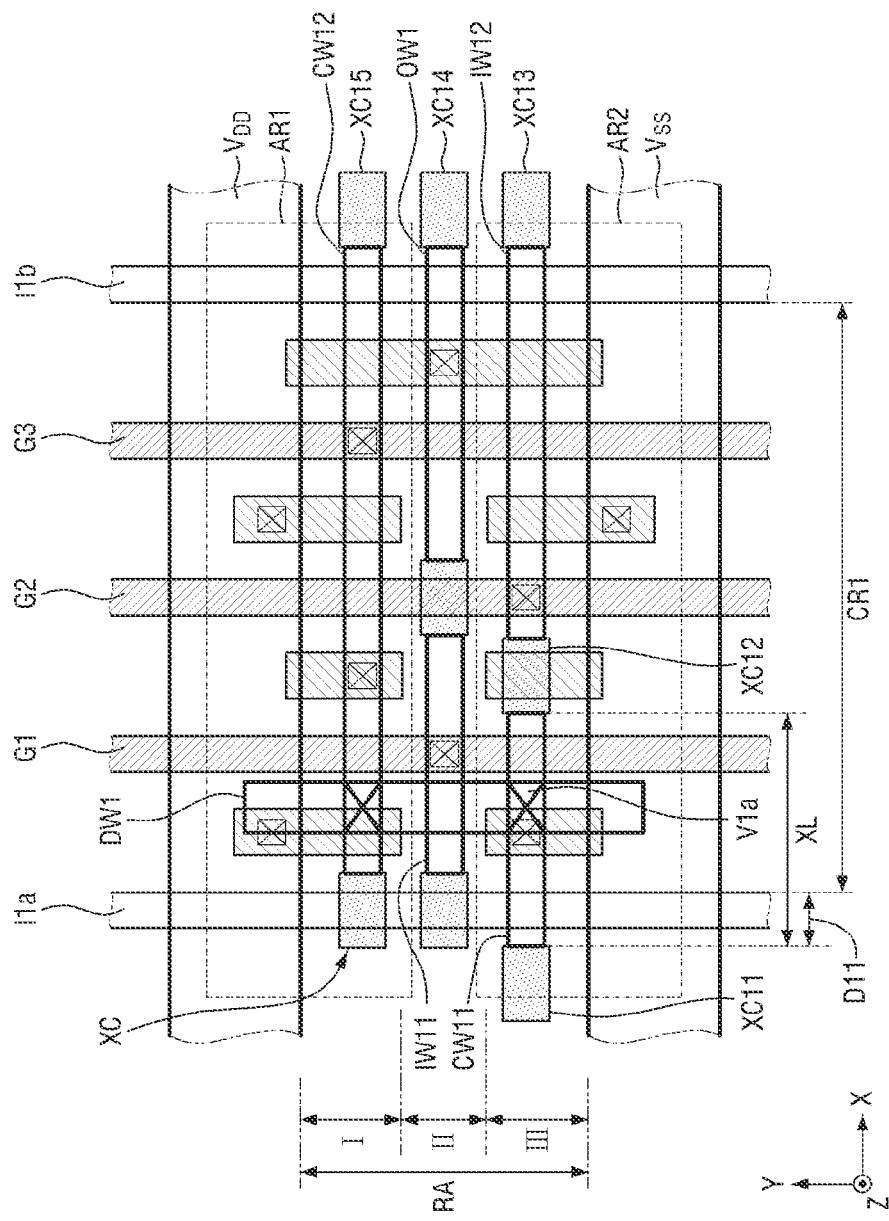
FIGS. 29A to 29C are various layout diagrams for explaining the layout design method for the semiconductor device according to some embodiments.
Figure 29B:
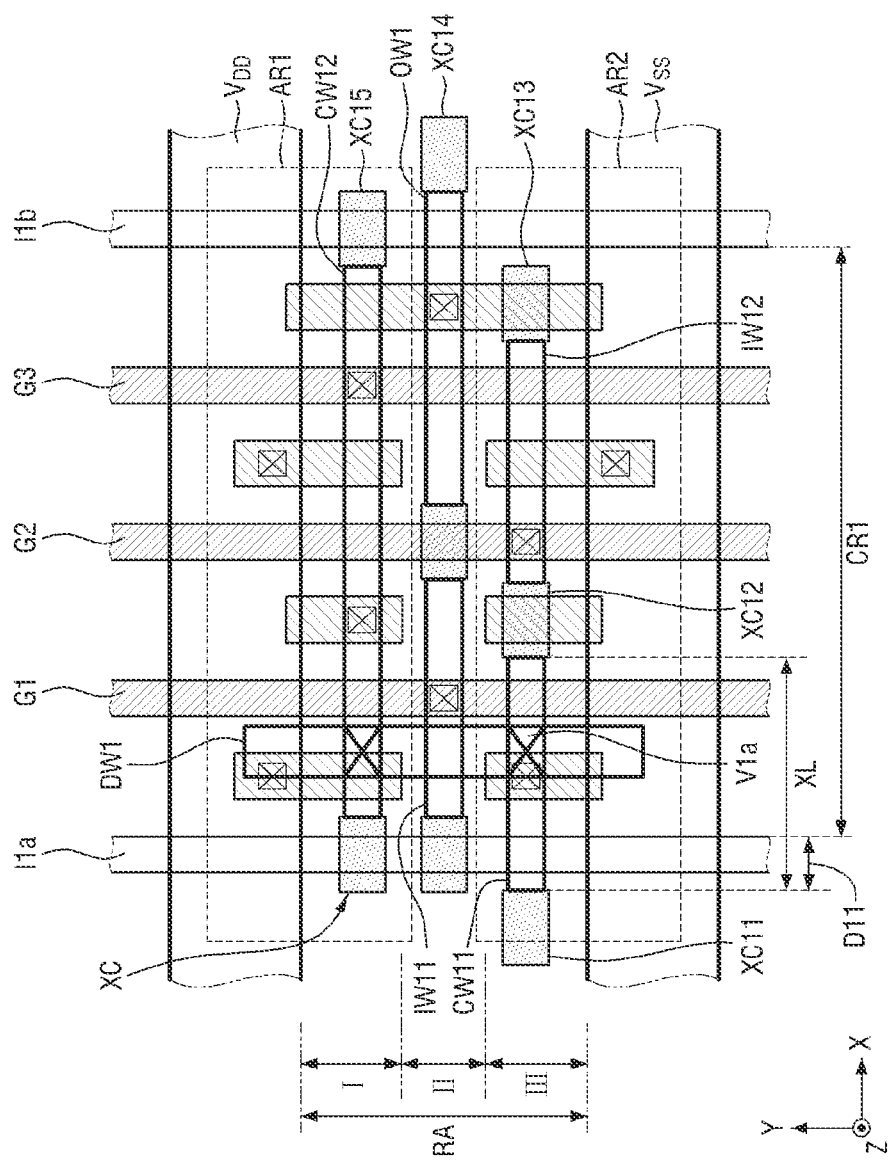
Figure 29C:
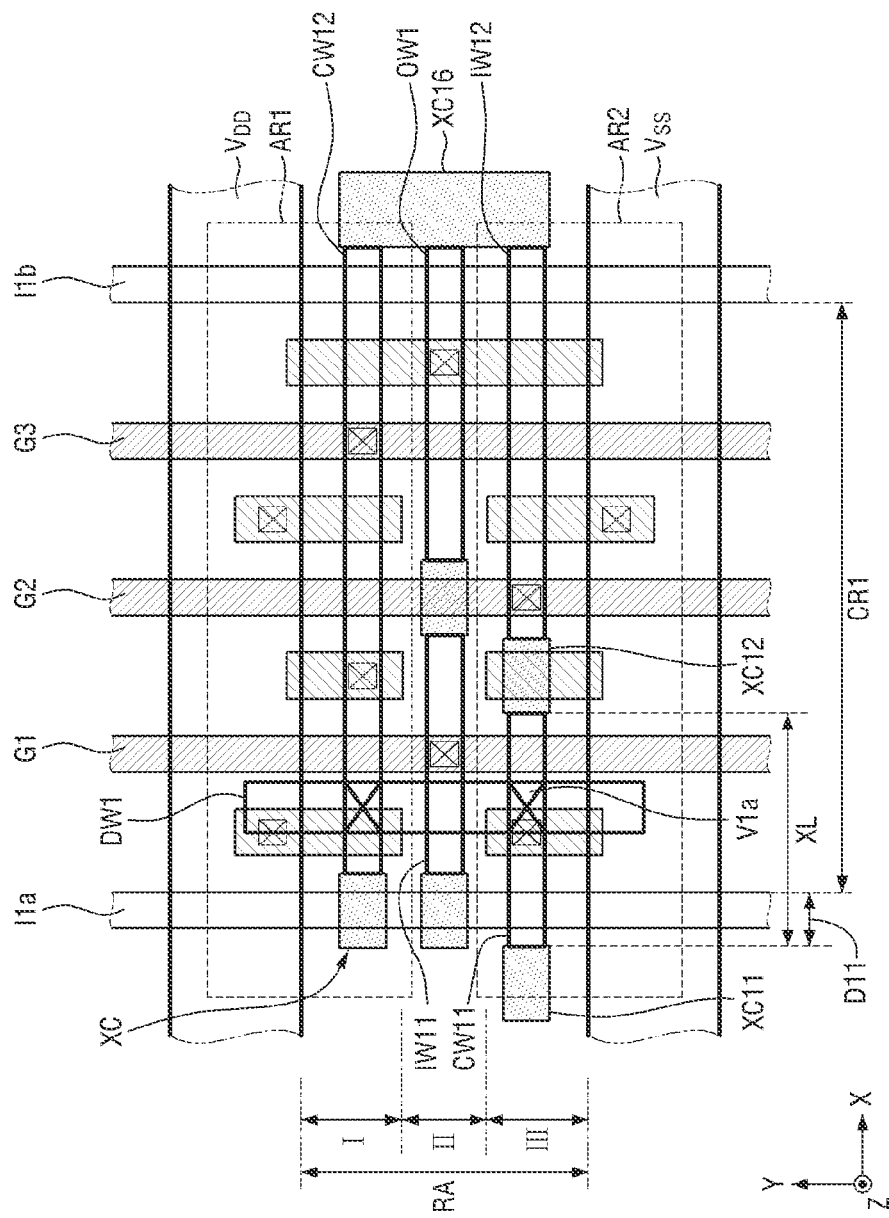

FIGS. 29A to 29C are various layout diagrams for explaining the layout design method for the semiconductor device according to some embodiments. For convenience of explanation, repeated parts of contents explained above using FIGS. 1 to 28 will be briefly described or omitted. Referring to FIGS. 29A to 29C, in the layout design method for the semiconductor device according to some embodiments, the cutting mask patterns XC may be designed so that at least some of the first routing wirings IW11, IW12, CW11, CW12, and OW1 protrude or retract from the boundary of the first cell region CR1.

As an example, referring to FIGS. 29A and 29B, the cutting mask patterns XC may include a fifth cutting mask XC13, a sixth cutting mask XC14, and a seventh cutting mask XC15. The fifth cutting mask XC13 may define one end of the second wiring pattern IW12, the sixth cutting mask XC14 may define one end of the fifth wiring pattern OW1, and the seventh cutting mask XC13 may define one end of the fourth wiring pattern CW12.

As an example, as shown in FIG. 29A, each of the fifth cutting mask XC13, the sixth cutting mask XC14, and the seventh cutting mask XC15 may be shifted in a direction toward the outside of the first cell region CR1 (e.g., +X direction). In some embodiments, the fifth cutting mask XC13, the sixth cutting mask XC14, and the seventh cutting mask XC15 may be arranged in a row along the second direction Y outside the first cell region CR1.

As another example, as shown in FIG. 29B, the fifth cutting mask XC13 may be shifted in a direction toward the inside of the first cell region CR1 (e.g., -X direction), and the sixth cutting mask XC14 may be shifted in the direction toward the outside of the first cell region CR1 (e.g., +X direction). The seventh cutting mask XC15 may not be shifted.

Also, as an example, referring to FIG. 29C, the cutting mask patterns XC may include an eighth cutting mask XC16. The eighth cutting mask XC16 extends in the second direction Y, and may define one end of the second wiring pattern IW12, one end of the fifth wiring pattern OW1, and one end of the fourth wiring pattern CW12.

As an example, the eighth cutting mask XC16 may be placed outside the first cell region CR1. Therefore, the second wiring pattern IW12, the fifth wiring pattern OW1, and the fourth wiring pattern CW12 may be designed to protrude from the boundary of the first cell region CR1.

Figure 30A:
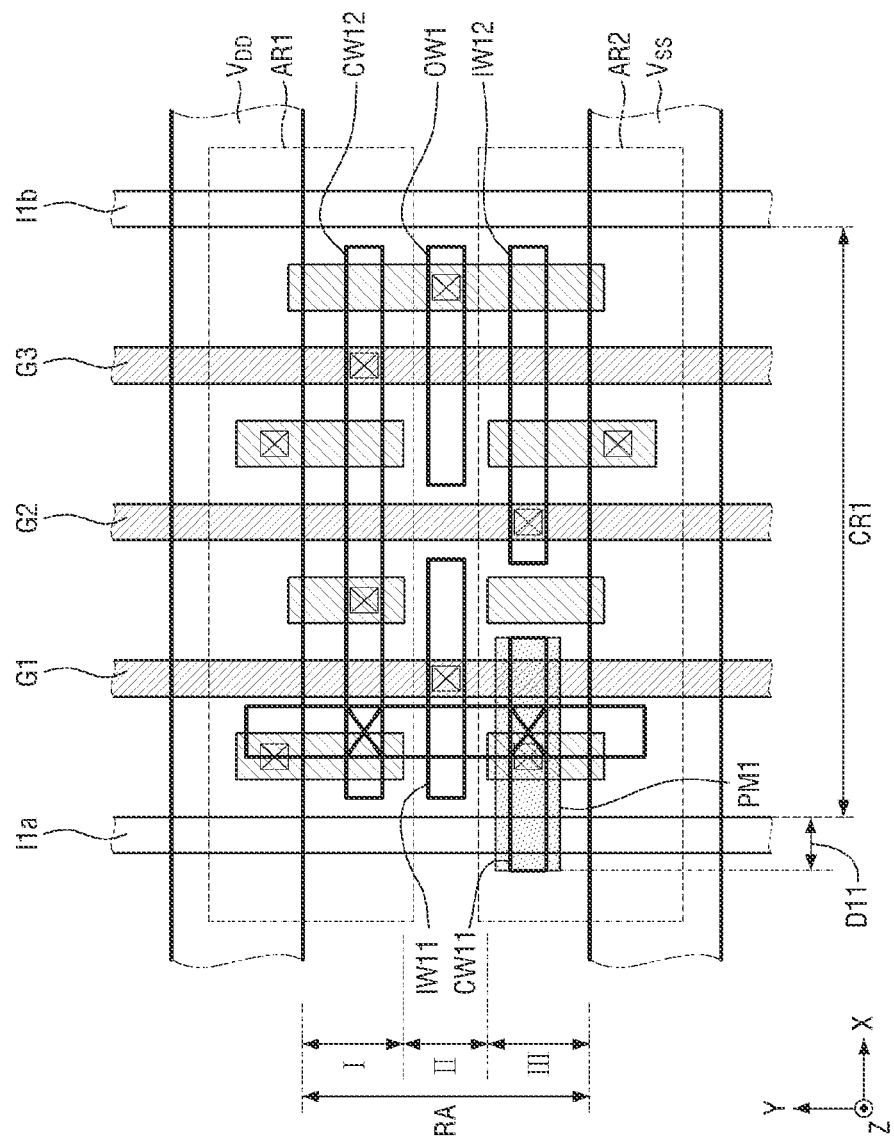
FIGS. 30A and 30B are various layout diagrams for explaining the layout design method for the semiconductor device according to some embodiments.
Figure 30B:
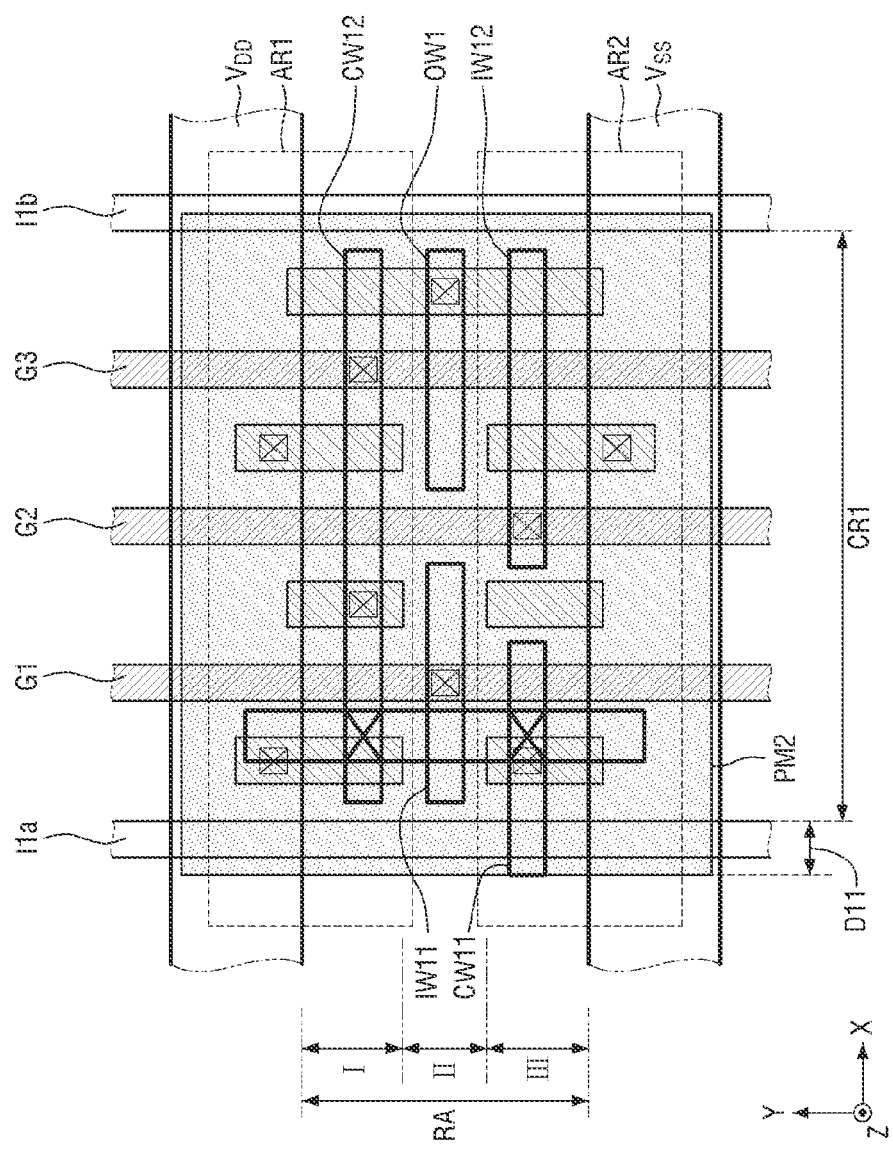

FIGS. 30A and 30B are various layout diagrams for explaining the layout design method for the semiconductor device according to some embodiments. For convenience of explanation, repeated parts of contents explained above using FIGS. 1 to 28 will be briefly described or omitted. Referring to FIG. 30A, the layout design method for the semiconductor device according to some embodiments may include provision of a first protective mask layer PM1.

The first protective mask layer PM1 may define at least some of the first routing wirings IW11, IW12, CW11, CW12, and OW1. Specifically, the first protective mask layer PM1 may be provided to cover at least some of the first routing wirings IW11, IW12, CW11, CW12, and OW1. The regions of the first routing wirings IW11, IW12, CW11, CW12, and OW1 that overlap the first protective mask layer PM1 may be protected. For example, the first protective mask layer PM1 may protect the routing wiring from being cut by the cutting mask patterns (XC of FIG. 26).

In some embodiments, the first protective mask layer PM1 may be placed so that at least some of the first routing wirings IW11, IW12, CW11, CW12, and OW1 protrude or retract from the boundary of the first cell region CR1. As an example, the first protective mask layer PM1 may overlap the third wiring pattern CW11. Therefore, the third wiring pattern CW11 may be designed to protrude from the boundary of the first cell region CR1.

Referring to FIG. 30B, the layout design method for the semiconductor device according to some embodiments may include provision of a second protective mask layer PM2. The second protective mask layer PM2 may be provided to cover the first cell region CR1. In addition, the regions of the first routing wirings IW11, IW12, CW11, CW12, and OW1 that overlap the second protective mask layer PM2 may be protected. For example, the second protective mask layer PM2 may protect the routing wirings from being cut by the cutting mask patterns (XC of FIG. 26).

In some embodiments, the boundary of the second protective mask layer PM2 may be placed to protrude or retract from the boundary of the first cell region CR1. As an example, one side of the second protective mask layer PM2 may be shifted in the direction toward the outside of the first cell region CR1 (e.g., -X direction). Therefore, the third wiring pattern CW11 may be designed to protrude from the boundary of the first cell region CR1.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A semiconductor device including a first cell region, comprising:

an active pattern extending in a first direction, inside the first cell region;
a gate electrode extending in a second direction intersecting the first direction, inside the first cell region;
a source/drain contact connected to a source/drain region of the active pattern, on one side of the gate electrode; and
a first wiring pattern extending in the first direction and connected to one of the gate electrode and the source/drain contact;
wherein a part of the first wiring pattern protrudes from a boundary of the first cell region, and wherein a length of the first wiring pattern extending in the first direction is two gate pitches or less.

2. The semiconductor device of claim 1, wherein the length of the first wiring pattern extending in the first direction is 0.5 gate pitch or more and 1.5 gate pitches or less.

3. The semiconductor device of claim 1, wherein the first cell region includes a plurality of routing tracks arranged along the second direction, and wherein the first wiring pattern is placed in one of the plurality of routing tracks.

4. The semiconductor device of claim 3, further comprising:
a second wiring pattern extending in the first direction and connected to the other of the gate electrode and the source/drain contact; and
wherein the second wiring pattern is placed in the other of the plurality of routing tracks.

5. The semiconductor device of claim 3, wherein the number of the plurality of routing tracks is in a range from one to three tracks.

6. The semiconductor device of claim 1, further comprising:
a first power supply wiring and a second power supply wiring extending side by side in the first direction; and
wherein the first wiring pattern is interposed between the first power supply wiring and the second power supply wiring.

7. The semiconductor device of claim 6, wherein the first wiring pattern, the first power supply wiring, and the second power supply wiring are placed at the same routing level as each other.

8. The semiconductor device of claim 1, further comprising:
a routing wiring extending in the second direction and connected to the first wiring pattern; and
wherein the routing wiring is placed at a routing level higher than the first wiring pattern.

9. The semiconductor device of claim 8, wherein the part of the first wiring pattern protrudes from the boundary of the first cell region extending in the second direction; and
wherein a part of the second wiring pattern protrudes from the boundary of the first cell region extending in the first direction.

10. A semiconductor device which includes a first cell region and a second cell region adjacent to each other and arranged along a first direction, the semiconductor device comprising:
a substrate;
a first cell separation pattern which extends in a second direction intersecting the first direction to separate the first cell region and the second cell region, on the substrate;
an active pattern extending in the first direction, on the substrate;
a first gate electrode, which extends in the second direction and is spaced apart from the first cell separation pattern by one gate pitch, on the substrate in the first cell region;
a first source/drain contact connected to a source/drain region of the active pattern of the first cell region, on one side of the first gate electrode; and
a first wiring pattern, which extends in the first direction over the first cell region and the second cell region, and is connected to one of the first gate electrode and the first source/drain contact; and
wherein a length of the first wiring pattern extending in the first direction is two gate pitches or less.

11. The semiconductor device of claim 10, further comprising:
a second gate electrode extending in the second direction, on the substrate in the second cell region;
a second source/drain contact connected to a source/drain region of the active pattern of the second cell region, on one side of the second gate electrode; and
a second wiring pattern that is spaced apart from the first cell separation pattern, extends in the first direction, and is connected to one of the second gate electrode and the second source/drain contact.

12. The semiconductor device of claim 11, wherein the first wiring pattern and the second wiring pattern are arranged along the first direction and placed at the same routing level as each other.

13. The semiconductor device of claim 12, wherein a spaced distance of the second wiring pattern from the first cell separation pattern is 0.5 times a gate pitch or more.

14. The semiconductor device of claim 10, wherein the first cell region includes a plurality of first routing wirings including the first wiring pattern and placed at the same routing level as each other; and wherein the number of the first routing wirings arranged along the second direction among the plurality of the first routing wirings is three or less.

15. The semiconductor device of claim 10, further comprising:
a second cell separation pattern which extends in the second direction and is spaced apart from the first cell separation pattern by one gate pitch; and
wherein the second cell region is a filler cell region interposed between the first cell separation pattern and the second cell separation pattern.

16. The semiconductor device of claim 10, wherein the active pattern includes a fin-type pattern protruding from an upper surface of the substrate.

17. The semiconductor device of claim 10, wherein the active pattern includes a plurality of wire patterns spaced apart from each other on the substrate.

18. A layout design method for a semiconductor device, the method comprising:
providing a first cell region; and
providing a second cell region arranged adjacent to the first cell region along a first direction;
wherein the first cell region includes:
a gate electrode extending in a second direction intersecting the first direction;
a source/drain contact connected to a source/drain region of the first cell region, on one side of the gate electrode; and
a first wiring pattern which extends in the first direction over the first cell region and the second cell region, and is connected to one of the gate electrode and the source/drain contact.

19. The layout design method for the semiconductor device of claim 18, wherein a length of the first wiring pattern extending in the first direction is two gate pitches or less.

20. The layout design method for the semiconductor device of claim 18,
   wherein the second cell region includes:
      a second gate electrode extending in the second direction;
      a second source/drain contact connected to a source/drain region of the second cell region, on one side of the second gate electrode, and
      a second wiring pattern which extends in the first direction, is spaced apart from the first wiring pattern in the first direction, and is connected to one of the second gate electrode and the second source/drain contact; and
   wherein the first wiring pattern and the second wiring pattern are placed at the same routing level as each other.

* * * * *